United States Patent
Terashima

(10) Patent No.: US 8,087,669 B2
(45) Date of Patent: *Jan. 3, 2012

(54) METHOD OF AND EQUIPMENT FOR CONVEYING SHEET PAPER HAVING A TEMPORARY DEFORMITY

(75) Inventor: Toshikatsu Terashima, Nagano (JP)

(73) Assignee: Wintec Co., Ltd., Nagano (JP)

( * ) Notice: Subject to any disclaimer, the term of this patent is extended or adjusted under 35 U.S.C. 154(b) by 136 days.

This patent is subject to a terminal disclaimer.

(21) Appl. No.: 11/919,583

(22) PCT Filed: Jul. 18, 2007

(86) PCT No.: PCT/JP2007/064211
§ 371 (c)(1),
(2), (4) Date: Mar. 13, 2008

(87) PCT Pub. No.: WO2008/023514
PCT Pub. Date: Feb. 28, 2008

(65) Prior Publication Data
US 2009/0218757 A1    Sep. 3, 2009

(30) Foreign Application Priority Data
Aug. 24, 2006  (JP) ................. 2006-228199

(51) Int. Cl.
*B65H 5/00*  (2006.01)
(52) U.S. Cl. .................................... 271/264; 406/86
(58) Field of Classification Search .............. 406/86, 406/88, 92; 226/97.3; 493/395–464; 271/264
See application file for complete search history.

(56) References Cited

U.S. PATENT DOCUMENTS

| | | | | | |
|---|---|---|---|---|---|
| 4,055,003 | A | * | 10/1977 | Sack | 34/632 |
| 5,162,036 | A | * | 11/1992 | Peter et al. | 493/416 |
| 5,556,360 | A | * | 9/1996 | Kober et al. | 493/23 |
| 6,206,361 | B1 | * | 3/2001 | Geldmeier | 271/9.12 |
| 6,619,583 | B2 | * | 9/2003 | Henry et al. | 242/615.12 |
| 7,392,984 | B2 | * | 7/2008 | Rohde et al. | 271/264 |
| 7,798,488 | B1 | * | 9/2010 | Terashima | 271/188 |
| 2009/0197751 | A1 | * | 8/2009 | Gale | 493/405 |
| 2009/0218757 | A1 | * | 9/2009 | Terashima | 271/225 |

FOREIGN PATENT DOCUMENTS

| | | |
|---|---|---|
| EP | 0 879 780 A1 | 11/1998 |
| EP | 1 008 542 A1 | 6/2000 |
| JP | 56-31165 A | 3/1981 |
| JP | 61-34550 U | 3/1986 |
| JP | 3-18537 A | 1/1991 |
| JP | 10-216347 A | 8/1998 |
| JP | 10-222722 A | 8/1998 |
| JP | 2006-218275 A | 8/2006 |

* cited by examiner

*Primary Examiner* — Jeremy R Severson
(74) *Attorney, Agent, or Firm* — Birch, Stewart, Kolasch & Birch, LLP

(57) ABSTRACT

The present invention provides a method of suitably conveying a sheet-shaped member 32. The method of the present invention is performed in an equipment 20 including: a blower duct 22; a sheet feeding unit 28 for feeding the sheet-shaped member 32 to the blower duct 22; and an air stream unit 24 for generating an air stream in the blower duct 22, and the method comprises the steps of: forming a temporary deformity 32b in the sheet-shaped member 32; feeding the sheet-shaped member from the sheet feeding unit 28 to the blower duct 22; and conveying the sheet-shaped member by applying a wind pressure to the deformity 32b.

64 Claims, 25 Drawing Sheets

METHOD OF AND EQUIPMENT FOR CONVEYING SHEET PAPER HAVING A TEMPORARY DEFORMITY

FIELD OF TECHNOLOGY

The present invention relates to a method of conveying a sheet-shaped member by using an air stream and an equipment for conveying the sheet-shaped member.

BACKGROUND TECHNOLOGY

Conventionally, in game halls, banknotes are conveyed by a conveying equipment including a belt mechanism or rollers.

In an extensive game hall, the conventional equipment must be large in size and a running cost for driving the belt mechanism or rollers must be very high.

Thus, equipments for conveying banknotes, in each of which banknotes are conveyed by an air stream, have been developed (see Patent Documents 1, 2 and 3).

In comparison with the equipments including the belt mechanism or rollers, the equipments using air streams for conveying banknotes can be small in size and their running costs can be reduced.

Patent Document 1: Japanese Patent Gazette No. 3-18537
Patent Document 2: Japanese Patent Gazette No. 10-222722
Patent Document 3: Japanese Patent Gazette No. 10-216347

DISCLOSURE OF THE INVENTION

The inventor performed an experiment, in which banknotes were conveyed by an air stream.

In FIG. 31, straightened sheet-shaped members 10 are conveyed in a blower duct 11. The inventor found that the sheet-shaped members 10 were sucked onto and held on inner faces 11a of the blower duct 11 even if the sheet-shaped members 10 were straightened. In case that the sheet-shaped members 10 were moved close to one of the inner faces 11a of the blower duct 11, a flow speed of an air stream was increased on the one inner face, so that the sheet-shaped members 10 were drawn and a negative pressure was generated between the sheet-shaped members 10 and the one inner face 11a.

As described above, in case that the sheet-shaped members are merely conveyed through the blower duct, the sheet-shaped members are sucked onto and held on the inner faces of the blower duct, so that they cannot be well conveyed.

The present invention has been performed so as to solve the above described problem, and an object of the present invention is to provide a method and an equipment for conveying a sheet-shaped member, in each of which the sheet-shaped member can be well conveyed by using an air stream.

The method of conveying a sheet-shaped member of the present invention is performed in an equipment including: a blower duct; a sheet feeding unit for feeding the sheet-shaped member to the blower duct; and an air stream unit for generating an air stream in the blower duct, and the method comprises the steps of: forming a temporary deformity in the sheet-shaped member; feeding the sheet-shaped member from the sheet feeding unit to the blower duct; and conveying the sheet-shaped member by applying a wind pressure to the deformity.

The equipment for conveying a sheet-shaped member of the present invention includes: a blower duct; a sheet feeding unit for feeding the sheet-shaped member to the blower duct; and an air stream unit for generating an air stream in the blower duct, the equipment further includes a bending unit for bending the sheet-shaped member so as to form a temporary deformity in the sheet-shaped member, and the sheet-shaped member is conveyed by applying a wind pressure to the deformity.

Preferably, the temporary deformity is formed in a rear part of the sheet-shaped member with respect to the conveying direction.

Preferably, the temporary deformity is formed in a flat part of the sheet-shaped member and is concaved or projected toward the sheet feeding unit. Concretely, the temporary deformity may be formed into a rounded surface, an L-shape, a cylindrical shape or a zigzag shape.

The equipment may further include a bending unit for bending the sheet-shaped member and may feed the sheet-shaped member, in which the temporary deformity has been automatically formed by the bending unit, to the blower duct.

The temporary deformity may be formed by passing the sheet-shaped member, whose rear part has been folded into two, between feed rollers.

Further, many types of the bending units may be employed.

Preferably, a plurality of ribs extending in the air-streaming direction are formed in each of wall faces of the blower duct, which face surfaces of the sheet-shaped member, and a distance between front ends of the ribs formed in each of the wall faces is designed to allow the deformity of the sheet-shaped member to pass through a space between the ribs.

The blower duct may be constituted by straight ducts and bent ducts. For example, a twisted duct section, which is twisted a prescribed angle with respect to an axial line of the blower duct, may be connected to the blower duct, so that the blower duct can be optionally designed.

A collecting unit, which collects the sheet-shaped member conveyed through the blower duct, may be provided to an end part of the blower duct.

Preferably, the collecting unit may have a separating section, which has an air discharge tube and which separates the sheet-shaped member from the air stream. The air discharge tube may be connected to the air stream unit so as to circulate the air steam. In this case, the air discharge tube may be connected to an external air-inlet.

The collecting unit may have a restoring roller, which bend the deformity of the sheet-shaped member in the opposite direction so as to remove the deformity.

A plurality of the sheet feeding units may be provided to the blower duct with at regular intervals.

In this case, a control system for controlling the sheet feeding units to feed the sheet-shaped members to the blower duct on the basis of the sheet-feeding order may be employed.

For example, the control system comprises: an entire control section; a plurality of individual control sections being respectively provided to the sheet feeding units; and one or a plurality of wiring systems, in which the entire control section and the individual control sections are sequentially connected like a loop, and wherein the entire control sections sends feeding-permissive signals of a prescribed level to the individual control sections of the sheet feeding units, and wherein the individual control section of one sheet feeding unit sends feeding-prohibitive signals to the sheet feeding units on the downstream side for a prescribed time period, in which the deformity is formed in the sheet-shaped member put in the one sheet feeding unit and the sheet-shaped member is conveyed and collected by the collecting unit, and sends feeding-permissive signals to the sheet feeding units on the downstream side for a prescribed time period after the sheet-shaped member is fed to the blower duct and a specified time elapses.

In this case, the individual control section of the one sheet feeding unit may send the feeding-permissive signals to the sheet feeding units on the downstream side for a prescribed time and may control them to feed the sheet-shaped members in order of position from the nearest to the furthest.

Preferably, the entire control section circularly outputs feeding right signals to the wiring system or systems, and the individual control section of each of the sheet feeding units feeds the sheet-shaped member into the blower duct when the sheet feeding unit is in a standby state and receives the feeding-permissive signal and the feeding right signal.

The entire control section may be included in each of the wiring systems on one side of the turning section of the blower duct, where the sheet-shaped member easily gets jammed.

A turning section sensor may be provided to the turning section of the blower duct, and the entire control section may send the feeding-prohibitive signals to the individual control sections of all of the sheet feeding units located on the upstream side of the turning section.

Outlet sensors may be respectively provided to parts of the blower duct, to which the sheet feeding units are connected, so as to check if the sheet-shaped member stays in the blower duct or not.

The individual control sections may prohibit to supply the sheet-shaped member to the sheet feeding units when the sheet-shaped member still stays.

The equipment of the present invention may be installed in a game hall, such as a pinball parlor and a casino, a store, such as a supermarket and a convenience store, an automatic vending machine and a sales space, such as a ticket office, a lottery kiosk and a betting booth, so as to collect sale proceeds; the equipment may convey banknotes to a cash register installed in a store, such as a supermarket and a convenience store, and a sales space, such as a ticket office, a lottery kiosk and a betting booth, as change; the equipment may convey and collect banknotes which has been put in an ATM; and the equipment may convey banknotes to an ATM for paying out.

EFFECTS OF THE INVENTION

In the method and the equipment of the present invention, the temporary deformity is formed in the sheet-shaped member, and the sheet feeding unit feeds the sheet-shaped member to the blower duct, so that the sheet-shaped member can be smoothly conveyed by applying the wind pressure to the deformity.

After collecting the sheet-shaped member, the deformity can be restored by the restoring means, so that no damage is left in the sheet-shaped member.

OPTIMUM EMBODIMENTS OF THE INVENTION

Optimum embodiments of the present invention will now be described in detail with reference to the accompanying drawings. Note that, the method and the equipment of the invention are encompassed in the same technical idea, so the equipment will be mainly explained in the following description.

Figure 1:
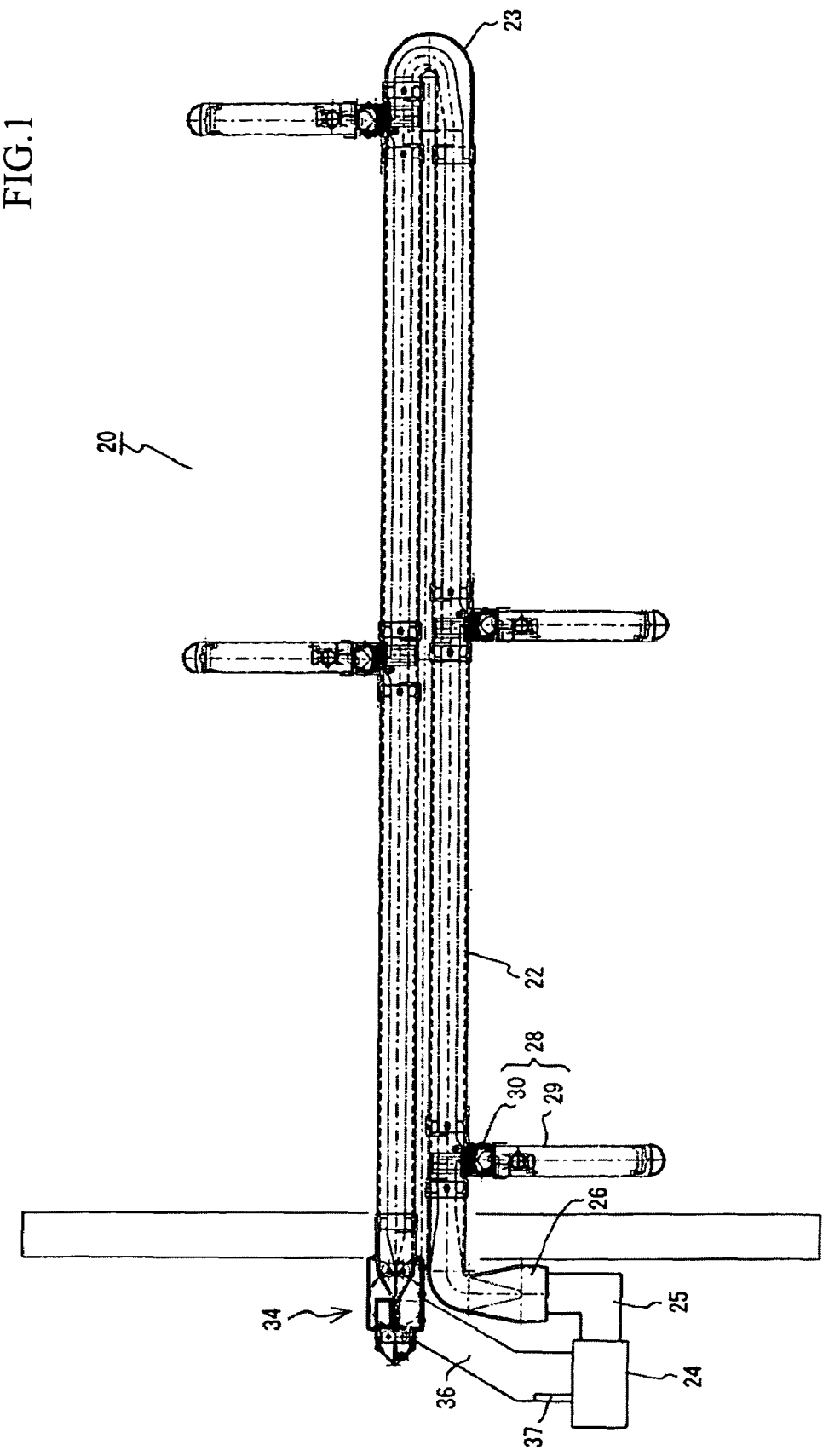
FIG. 1 is a schematic view of an equipment for conveying sheet-shaped members.

FIG. 1 is a schematic view of an entire equipment 20 for conveying sheet-shaped members.

In FIG. 1, a symbol 22 stands for a blower duct, which includes a turning section 23 and formed into a U-shape.

A symbol 24 stands for a blower section (an air stream unit), which is constituted by a blower and connected to an inlet of the blower duct 22 via a supply pipe 25 and a connection pipe 26 so as to supply air into the blower duct 22 and generate an air stream in the blower duct 22. Note that, the blower section (the air stream unit) 24 may be a suction blower capable of sucking air in the blower duct 22. Preferably, an air cleaner (a filter, an electric dust collector or an ozone generator), not shown, is provided between an air-inlet or an air-outlet of the blower section 24 and the blower duct 22.

A symbol 28 stands for a sheet feeding unit capable of feeding sheet-shaped members into the blower duct 22. In the sheet feeding unit 28 of the present embodiment, a banknote identification unit 29 is provided on the outer side, and a bending unit 30 is provided on the inner side.

The banknote identification unit 29 identifies denominations of banknotes and tells real banknotes from false ones, and a known device can be employed so detailed description will be omitted.

Preferably, a drive motor (not shown) of the blower section (air stream unit) 24 is started when supplying the sheet-shaped members into the sheet feeding unit 28 is detected. With this structure, electric power consumption can be reduced.

The bending unit 30, whose details will be explained later, forms a temporary deformity 32*b*, which is formed into, for example, an L-shape or a rounded surface, in a flat surface 32*a* of a rear end part of the sheet-shaped member 32.

Wind pressure of the air stream, which streams in the blower duct 22, is applied to the temporary deformity 32*b*, so that the sheet-shaped member 32 can be conveyed in the blower duct 22.

A plurality of the sheet feeding units 28 are provided to the blower duct 22. The equipment 20 of the present embodiment is installed in a pin ball parlor for collecting banknotes and acts as a banknote slot section of a ball lending unit, and one sheet feeding unit 28 is provided to one pin ball game machine.

The sheet-shaped members 32 are conveyed through the blower duct 22 by an air stream and collected by a collecting unit 34, which is provided to an end of the blower duct 22. Details of the collecting unit 34 will be described later.

Only the sheet-shaped members 32 are collected by the collecting unit 34, and air passing through the collecting unit 34 is returned to the blower section 24 via a return duct 36. The return duct 36 has an air-inlet 37, through which external air in introduced thereinto, and the return air and the external air are sent from the blower section 24 to the blower duct 22. By circulating the air with adding less external air, less air in the game hall, which has been polluted by cigarette smoke, is introduced into the blower duct 22. Note that, the structure of the blower duct 22 is not limited to the circulation duct.

Figure 2:
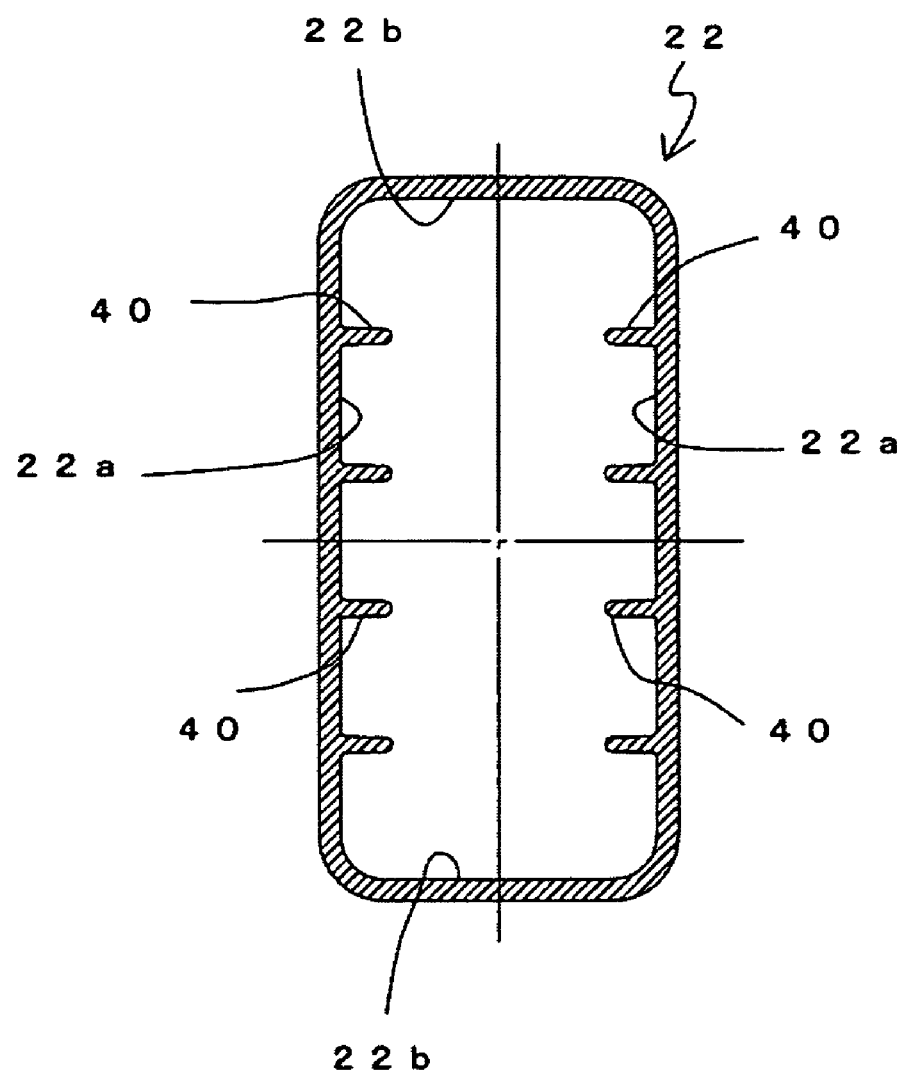
FIG. 2 is a sectional view of FIG. 1. It is a schematic view of an equipment for blower duct.

FIG. 2 is a sectional view of the blower duct 22.

In the present embodiment, the blower duct 22 has a rectangular sectional shape.

In wall faces (opposite wall faces 22*a* and 22*a*) of the blower duct 22, which face surfaces of the sheet-shaped member 32, a plurality of ribs 40 having a prescribed height are inwardly projected from each of the wall faces 22*a* and 22*a* and extended in the air-streaming direction. A distance between front ends of the opposite ribs 40 formed in each of the wall faces 22*a* and 22*a* is designed to allow the deformity 32*b* of the sheet-shaped member 32 to pass through the space therebetween. A distance between opposite wall faces 22*b* and 22*b* is designed to allow the sheet-shaped member 32 to pass through the space therebetween without being deformed. A space enclosed by the front ends of the ribs 40 and the wall faces 22*b* and 22*b*, in which the sheet-shaped member is passed, is formed into a rectangular shape. Note that, the blower duct 22 is not limited to the rectangular duct, so it may be, for example, a circular cylindrical duct.

Figure 4:
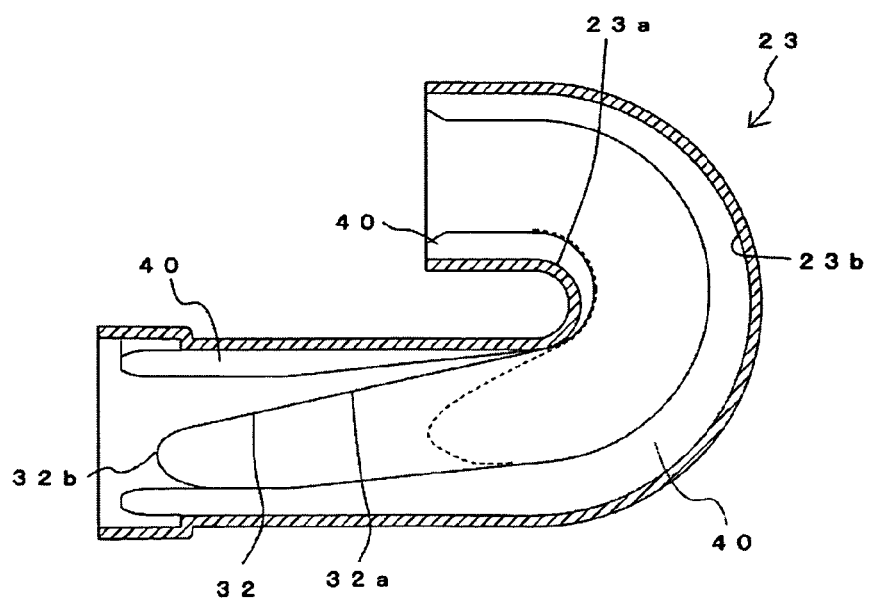
FIG. 4 is a sectional view of a turning section.

FIG. 4 is a sectional view of the turning section 23.

In the turning section 23, the sheet-shaped member 32 is curled to make one of the surfaces become an inner surface and conveyed therein.

The ribs 40 formed in an inner wall face 23*a* of the turning section 23 from the upstream side to the downstream side will be explained. A height of the ribs is gradually reduced from a specified position, which is located on the upstream side of the turning section 23 and separated a prescribed distance therefrom, to an inlet of the turning section. At the inlet of the turning section 23, the height of the ribs 40 is almost zero. On the other hand, the height of the ribs is gradually increased, from zero, from the inlet of the turning section 23 to a specified position, which is located on the downstream side of the turning section and separated a prescribed distance therefrom. Note that, "the height is zero" is not perfect zero, preferably they have a slight height.

A height of the ribs 40 formed on an outer wall face 23*b* of the turning section 23 may be equal to that of the ribs 40 formed in a straight part of the blower duct 22; preferably the height of the ribs 40 formed on an outer wall face 23*b* may be varied to follow that of the ribs 40 formed on the wall face 23*a* so as to maintain a distance between the ribs 40 on the wall face 23*a* and the ribs 40 on the wall face 23*b*. Namely, the height of the ribs 40 on the wall face 23*b* is gradually reduced from the upstream side of the turning section 23 to the turning section and is gradually increased from the turning section to the downstream side thereof.

The long straight part of the blower duct 22 is formed by connecting a plurality of short straight ducts. The turning section 23 is formed by connecting a turning duct to the straight ducts.

In case of connecting the straight ducts and the turning duct, if they are shifted, they cannot be well connected. To solve this problem, a flexible connection duct or ducts (not shown) may be use to absorb the shift therebetween.

Figure 5:
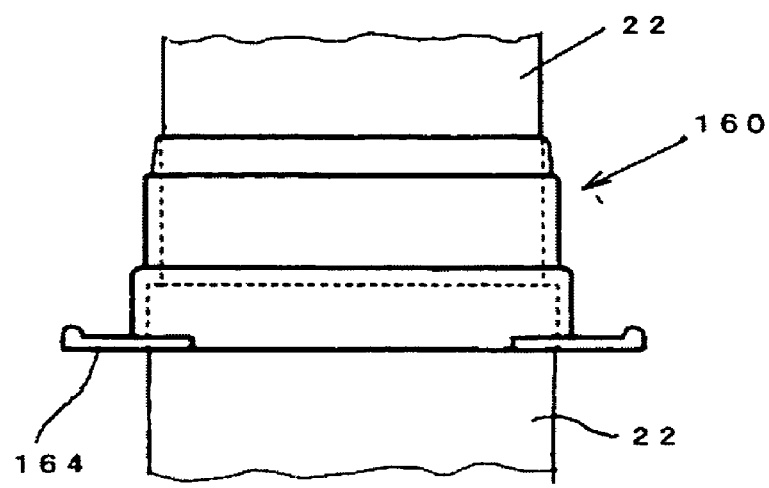
FIG. 5 is a front view of a sealing member.
Figure 6:
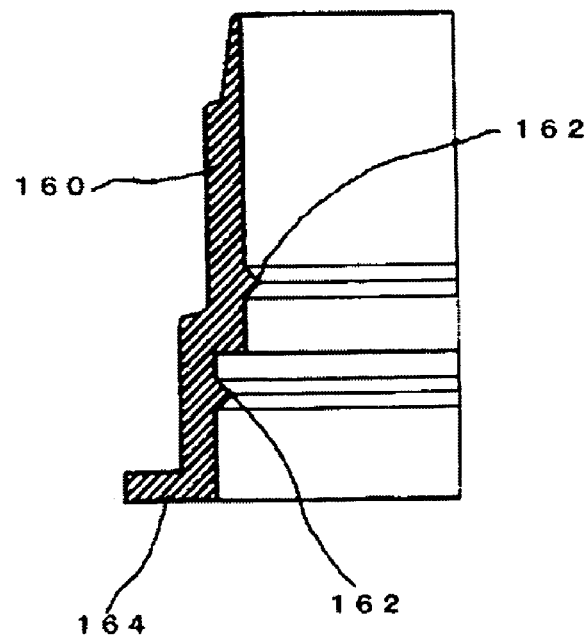
FIG. 6 is a partial sectional view of the sealing member.

Connection parts between the ducts of the blower duct 22 may be covered with sealing members 160 shown in FIGS. 5 and 6. The sealing member 160 is composed of resin or rubber and formed into a tubular shape, so ends of the ducts of the blower duct 22 are tightly inserted into the sealing member. Ring projections 162 are projected from an inner face of the sealing member 160 so as to respectively bite the ends of the ducts of the blower duct 22. By biting outer faces of the ducts of the blower duct 22, the blower duct can be air-tightly sealed. When negative pressure is generated in the blower duct 22 by the blower section, the sealing members 160 can tightly bite the ducts, so that sealing property can be improved. A flange 164 is formed at an end of the sealing member 160 and the sealing member can be easily turned over by pinching the flange, so the connection part can be easily exposed and maintenance can be easily performed.

Details of the sheet feeding unit 28 and the collecting unit 34 will be explained later, but a mechanism for conveying the sheet-shaped members 32 will be explained.

The rear end part of the sheet-shaped member 32 is formed into the deformity 32*b*, which has an L-shape, a rounded (arc-shaped) surface, a cylindrical shape or a zigzag shape, by the bending unit 30 of the sheet feeding unit 28 and fed into the blower duct 22.

Figure 7:
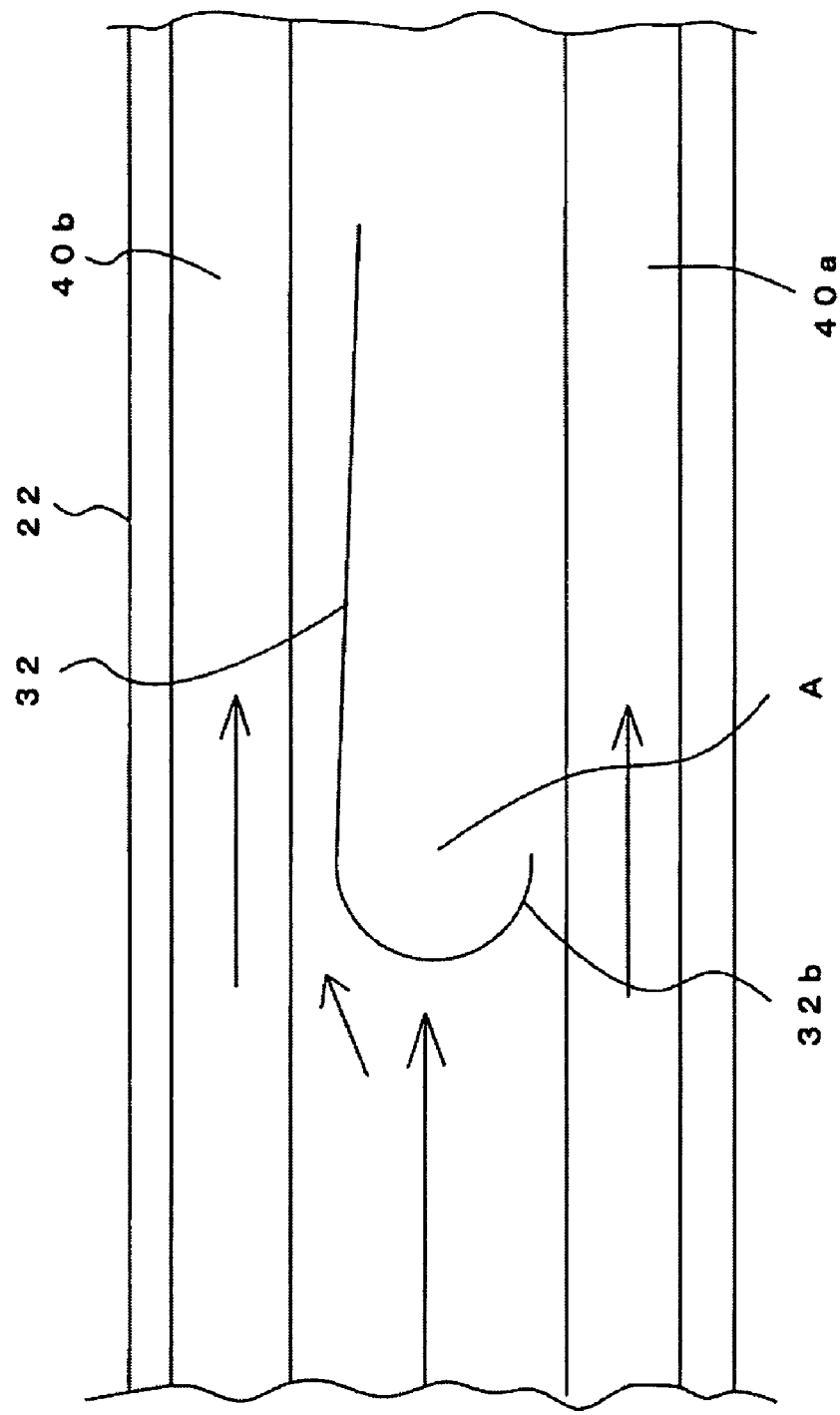
FIG. 7 is an explanation view showing a function of conveying sheet-shaped members.

As shown in FIG. 7, a space A exists between the sheet-shaped member 32 fed in the blower duct 22 and the ribs 40*a* located on the deformity 32 side, and air streams between the ribs 40*a*, so the sheet-shaped member does not tightly stick onto the ribs 40*a*. Air streams along the wall face on the deformity 32*b* side and enters a space between the ribs 40*b*, the deformity 32*b* is moved away from the ribs 40*b*, and the air streams between the ribs 40*b*, so the sheet-shaped member 32 does not tightly stick onto the ribs 40*a*.

The sheet-shaped member 32 is little resisted by the ribs 40*a* and 40*b*, so that the sheet-shaped member can be smoothly conveyed in the blower duct 22, by wind pressure applying to the deformity 32*b*, without flip-flopping the front end. The sheet-shaped member 32 is conveyed at a speed nearly equal to a wind speed, so a thrust force is initially generated by the wind pressure applying to the deformity 32*b*, and then the sheet-shaped member is conveyed in the blower duct 22 together with the air stream so that the sheet-shaped member can be smoothly conveyed in the blower duct 22.

When the deformity 32b is formed, the sheet-shaped member may be entirely formed into a U-shape.

In case of stably conveying the sheet-shaped member, a starting point of the deformity 32b is formed in the rear end part of, for example, a banknote, preferably the starting point is separated 5-50 mm (if a length of the banknote is about 16 cm, about 3-35% of the length) from the rear end of the banknote. Note that, the starting point of the deformity means, for example, a contact point between an arc part of the rounded surface and a linear part thereof.

As described above, by forming the ribs 40 in the wall faces 22a and 22b of the blower duct 22, a contact area of the sheet-shaped member 32 can be reduced so that contact resistance can be reduced and the sheet-shaped member 32 can be smoothly conveyed.

By forming the ribs 40, a duct sectional area of the blower duct 22 can be increased. In a banknote collecting equipment installed in a pin ball parlor, a long convey duct is required; if the convey duct is narrow, it is difficult to convey banknotes to the end of the duct.

By forming the ribs 40, the duct sectional area can be increased and pressure loss can be reduced, so that the sheet-shaped members can be conveyed further.

In the turning section 34 shown in FIG. 4, the height of the ribs 40 formed in the inner wall face 32a is designed as described above, namely the height of the ribs 40 on the upstream side of the turning section 32 is gradually reduced toward the inlet of the turning section 23, so that the speed of the air stream between the front end part of the sheet-shaped member 32 and the wall face 23a is increased and air pressure is reduced when the sheet-shaped member 32 approaches the turning section 232. On the other hand, the speed of the air stream between the front end part of the sheet-shaped member 32 and the wall face 23b is reduced and air pressure is increased, so that the front end of the sheet-shaped member 32 is drawn toward the inner wall face 23a of the turning section 23.

Therefore, the front end part of the sheet-shaped member 32 contacts the inner wall face 23a of the turning section 32 and is curled therealong as shown by a dotted line shown in FIG. 4, so that the sheet-shaped member can be smoothly conveyed with little resistance even if the turning section 23 has a small curvature radius as shown in FIG. 4.

Figure 8A:
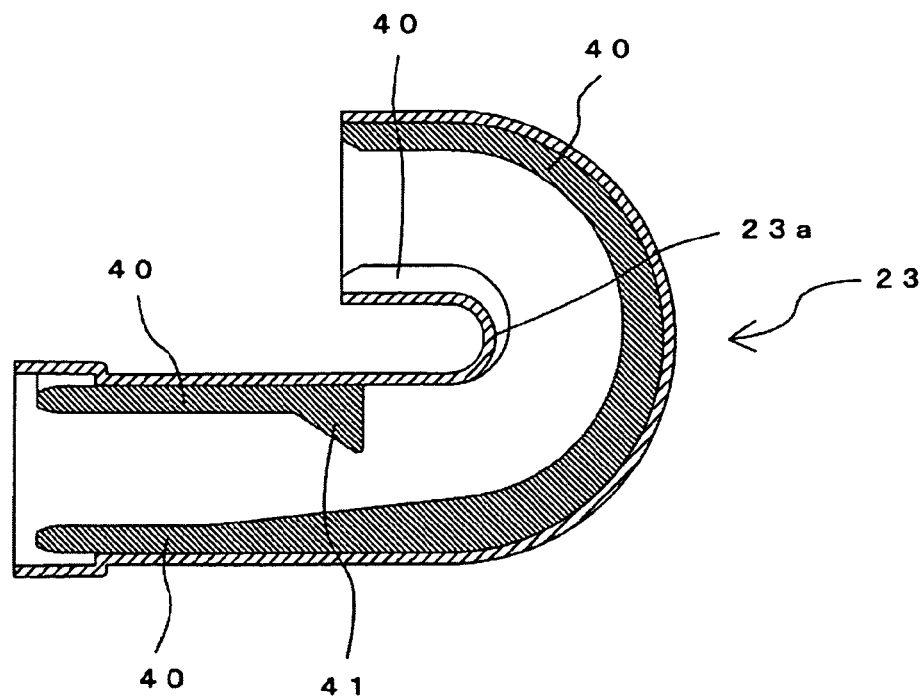
FIGS. 8A and 8B are explanation views of other examples of ribs in the turning section.
Figure 8B:
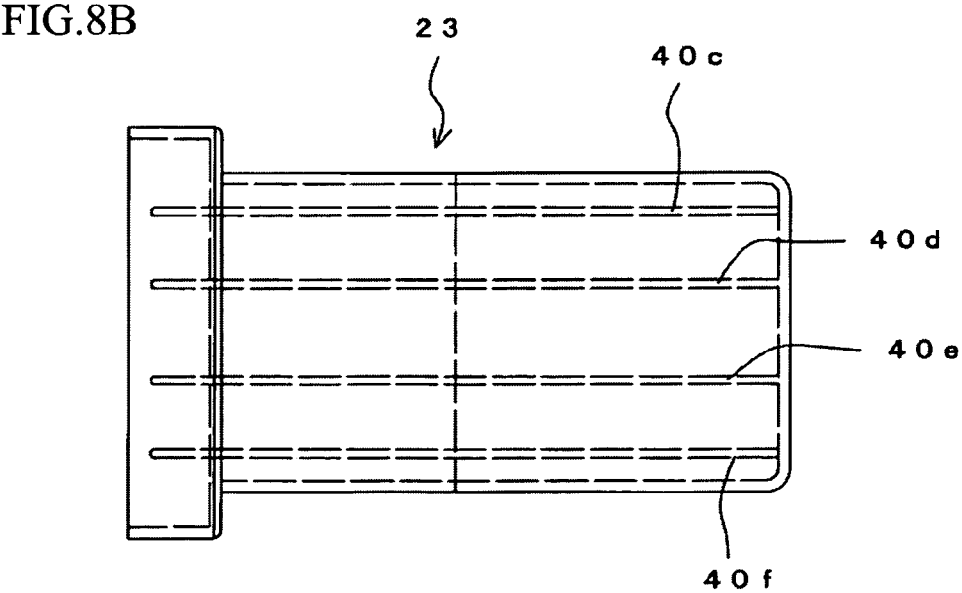

Other examples of the ribs 40 in the turning section 23 are shown in FIGS. 8A and 8B.

In the sheet feeding unit 28, it is difficult to put an old and flaccid banknote in an inlet of the sheet feeding unit 28, so the banknote 32 is, for example, folded two or three times along a transverse center line so as to strengthen the banknote 32 and then put in the sheet feeding unit 28.

The bending unit 30 is capable of curling the sheet-shaped member, but the folded line or lines cannot be restored.

In the case shown in FIG. 4, if the strengthened sheet-shaped member 32 is fed into the blower duct 22, the front end part of the sheet-shaped member 32 is drawn toward the inner wall face 23a of the turning section 23 and not curled along the wall face 23a, the linear shaped front end part is maintained and contacts the ribs 40 of the outer wall face of the turning section 23, so that the sheet-shaped member will close the turning section.

Thus, in the present embodiment, as shown in FIGS. 8A and 8B, raised parts 41, which are inwardly projected from the blower duct 22, are formed in the center ribs 40d and 40e of the ribs 40c, 40d, 40e and 40f formed in the inner wall face 23a of the turning section 23, and the raised parts are provided on the upstream side of and immediately before the inlet of the turning section 23. The height of the ribs 40, which are formed from the inlet of the turning section toward the downstream side, is gradually increased from zero as well as the ribs shown in FIG. 4.

By forming the raised parts 41 in the ribs 40d and 40e, the front end of the sheet-shaped member 32 entering the turning section 23 runs on the raised parts 41.

A slight wind speed difference exists between the both sides of the sheet-shaped member 32, and the wind speed difference makes the wind pressure applying to the outer surface of the sheet-shaped member 32 higher than that applying to the inner surface thereof, so that a force like a tilting board is applied to the outer surface of the front end part of the sheet-shaped member 32, which has run on the raised parts 41, the top tips of the raised parts 41 act as fulcrum points, the front end part of the sheet-shaped member 32 is bent toward the inner wall face 23a even if the sheet-shaped member is strengthened, and the sheet-shaped member 32 is formed as shown in FIG. 4 and can be smoothly passed through the turning section 23.

Concave parts corresponding to the raised parts 41 need not be formed in the ribs 40, which are formed in the outer wall face of the turning section 23, so the height of the ribs 40 may be equal to that of the ribs 40 shown in FIG. 4.

Four ribs 40c-40f are formed in the above described example, but number of the ribs is not limited. The raised parts 41 may be formed in all of the ribs 40 formed in the inner wall face 23a. The shape of the raised parts 41 is not limited as far as the sheet-shaped members 32 can be smoothly conveyed.

Figure 9:
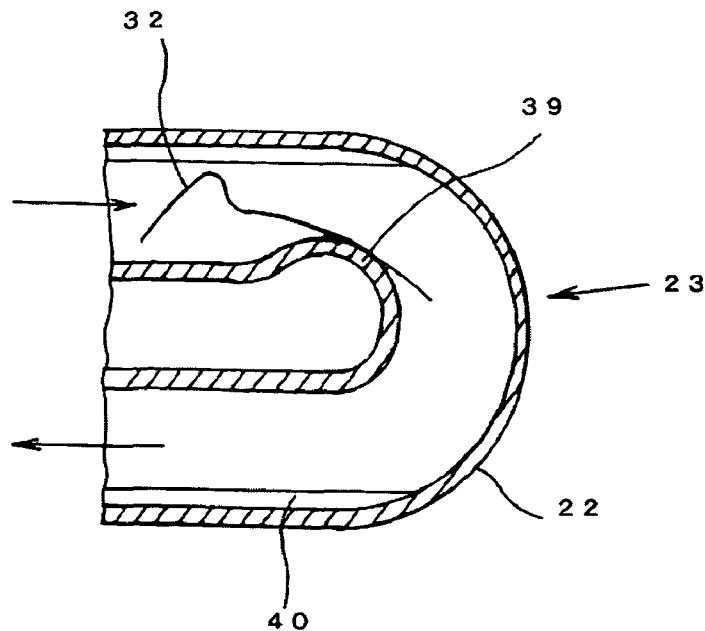
FIG. 9 is an explanation view of the turning section, wherein a raised part is formed in an inner face of the turning section.

For example, as shown in FIG. 9, raised parts 39 may be formed in the inner face of the inlet part of the turning section 23 of the blower duct 22 so as to reduce an effective sectional area of the blower duct 22 and increase the speed of the air stream. The raised parts 39 are formed by entirely raising the inner wall face, so they are not formed in the ribs. Further, no ribs 40 are formed in the inner wall faces (the inner wall face located on the outer side and the inner wall face located on the inner side) of the turning section 23 of the blower duct 22.

With the above described structure, the wind pressure difference is generated between the both surfaces of the sheet-shaped member 32, so that the strengthened sheet-shaped member 32 can be bent by the tilting board effect and passed through the turning section 23 without closing the turning section. Since no ribs are formed in the turning section, the sheet-shaped member 32 can be smoothly conveyed.

Next, details of the bending unit 30 of the sheet feeding unit 28 will be explained with reference to FIGS. 10-12.

Figure 10:
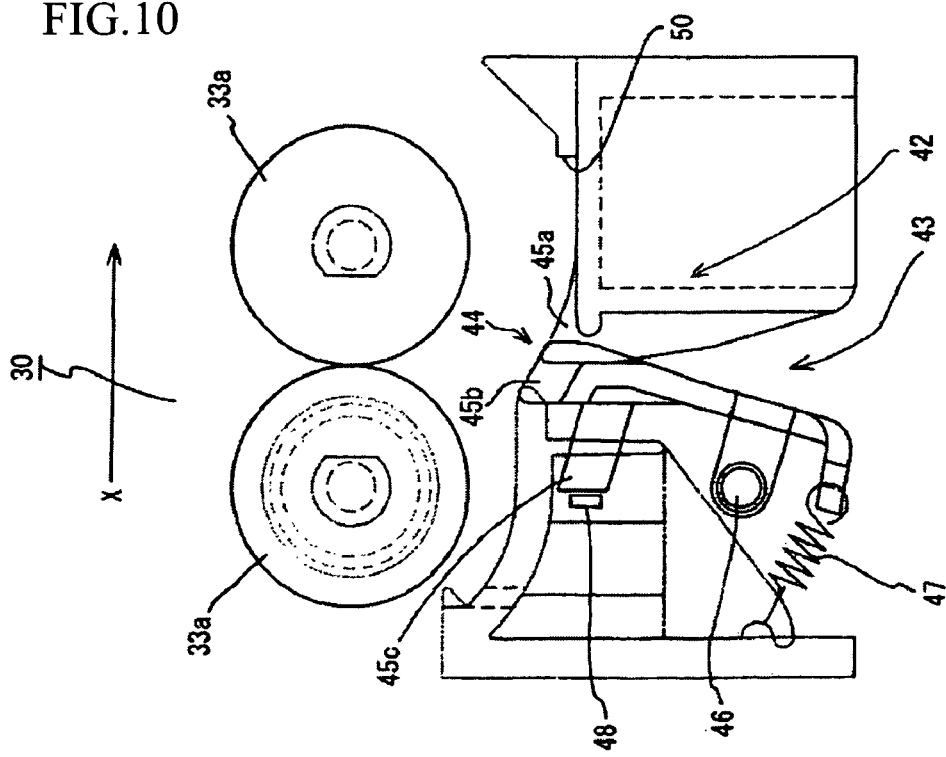
FIG. 10 is a detailed explanation view of the bending unit.

In FIG. 10, a pair of feed rollers 33a and 33a feed the sheet-shaped member 32 into the blower duct 22 in the direction perpendicular to the air-streaming direction. Gears (not shown), which are respectively coaxially connected to the feed rollers 33a and 33a, are engaged each other, and one of the feed rollers 33a is rotated by a motor, not shown, which can rotate in a normal direction and a reverse direction, so that the other feed roller 33a can be synchronously rotated. The other roller 33a is biased and pressed toward the one feed roller 33a by a spring, not shown, so that the sheet-shaped member 32 is pinched between the feed rollers 33a and 33a and the sheet-shaped member 32 can be fed. Note that, as described above, the sheet-shaped member 32 is fed into the blower duct 22 in the direction perpendicular to the air-streaming direction, but an angle of feeding the sheet-shaped member 32 may be optionally designed on the basis of an arrangement or an install space of the sheet feeding unit 28.

Banknotes, which have been checked by the banknote identification unit 29, are sent to the feed rollers 33a and 33a of the bending unit 30 from a pair of feed-out rollers (not shown) provided to the banknote identification unit 29.

Open/close means 42 is provided between the feed rollers 33a and 33a and the feed-out rollers. The open/close means 42 is capable of opening and closing a path 43 formed between the feed rollers 33a and 33a and the feed-out rollers and has a sloped guide section 44, which introduces the rear end of the sheet-shaped member toward the opposite side of the feed rollers 33a and 33a when the path 43 is closed (or shut).

For example, the open/close means 42 has a pair of claw pieces 45a and 45b, which are respectively provided on the both sides of the path 43, and at least one of the claw pieces 45a and 45b is a movable claw piece. In the present embodiment, the claw piece 45a is a fixed claw piece, and the claw piece 45b is the movable claw piece which can be turned about a shaft 46. One end of the movable claw piece 45b is pulled by a spring 47, so that the other end thereof is turned to overlap the fixed claw piece 45a.

For example, the fixed movable claw pieces 45a and the movable claw pieces 45b may be formed like combs, and each of the movable claw pieces may enter a space between the adjacent fixed movable claw pieces as shown in FIG. 10 so as to close the path 43.

When the other end of the movable claw piece 45b overlaps the fixed claw piece 45a, the sloped guide section 44 introduces the rear end part of the sheet-shaped member to side faces of the claw pieces 45a and 45b, which face the feed rollers 33a and 33a, so as to deform the rear end part.

As shown in FIG. 10, the sloped guide section 44 is inclined, toward the downstream side of the air stream passing through the blower duct 22, to gradually separate away from one of the rollers 33a and 33a, which is located on the downstream side. A stopper 50 is provided to an end of the sloped guide section 44. Note that, preferably, a width of the sloped guide section 44, which is perpendicular to a paper surface of FIG. 10, is slightly wider than that of the sheet-shaped member 32.

Figure 11:
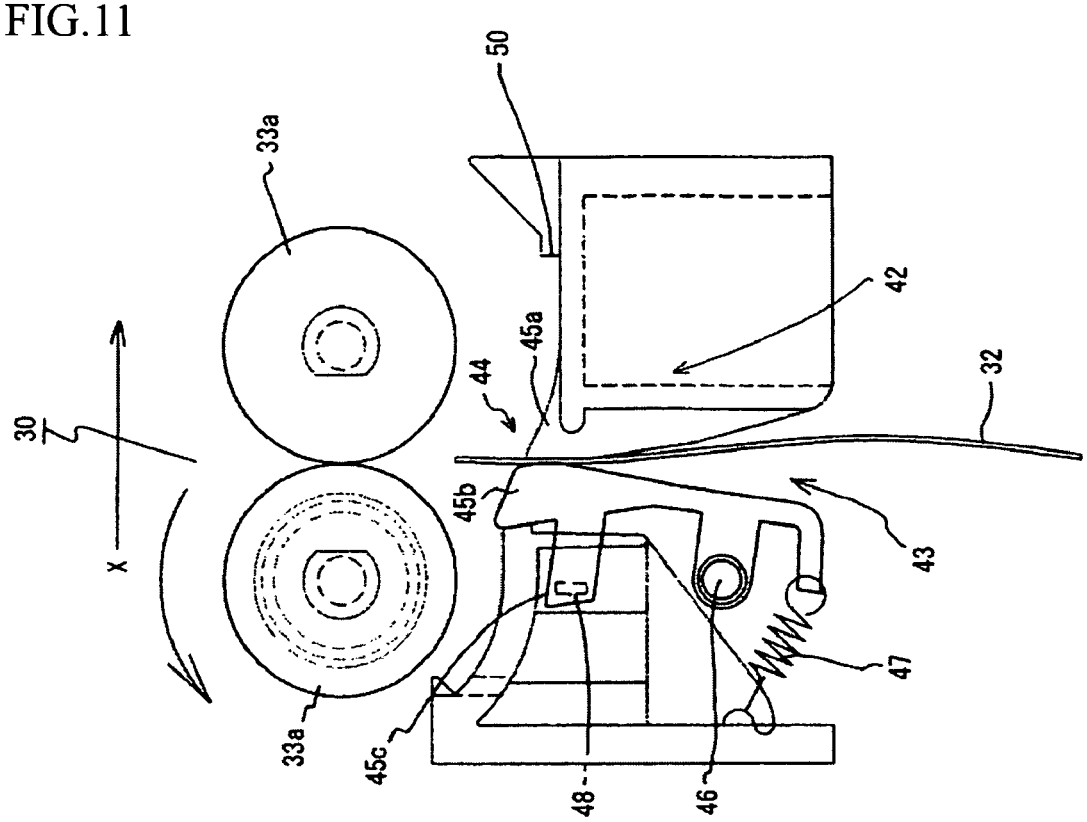
FIG. 11 is an explanation view of the bending unit, in which the sheet-shaped member is fed.

A sensor 48 includes a light emitting section and a light receiving section, the sensor is not masked by a lever 45c located on the movable claw piece 45b side as shown in FIG. 10 when no sheet-shaped member 32 passes; the sensor is masked by the lever 45c as shown in FIG. 11 when the sheet-shaped member 32 turns the movable claw piece 45c against elasticity of the spring 47. An ON signal and an OFF signal are inputted to a control section 120 (see FIG. 29), which controls the entire sheet feeding unit 28.

Next, the action of the bending unit 30 for forming the deformity 32b in the rear end part of the sheet-shaped member 32 will be explained with reference to FIG. 12.

In FIG. 12A, the sheet-shaped member (banknote) is put in the banknote identification unit 29 and identified thereby, at that time the feed rollers 33a and 33a are not rotated.

When the identified sheet-shaped member is sent toward the feed rollers 33a and 33a by rollers (not shown), the front end of the sheet-shaped member 32 turns the movable claw piece 45b against the elasticity of the spring 47, so that the lever 45c masks (turns off) the sensor 48. When the OFF signal of the sensor is inputted to a control section, not shown, the control section drives a motor, not shown, so as to rotate the feed rollers 33a and 33a in the sheet feeding direction (see FIG. 12B).

When the sheet-shaped member 32 is fed by the feed rollers 33a and 33a and the rear end of the sheet-shaped member 32 passes the claw pieces 45a and 45b as shown in FIG. 12C, the movable claw piece 45b is returned to the initial position by the elasticity of the spring 47, so that the path 43 is closed by the claw pieces 45a and 45b, the sensor 48 is returned to a light receiving state (turned on) and the ON signal is inputted to the control section.

By inputting the ON signal to the control section, the control section stops the motor once (see FIG. 12C), and then the motor is rotated a prescribed angle in the reverse direction. With this action, the sheet-shaped member 32 is moved a prescribed distance backward (see FIGS. 12D-12F).

Figure 12:
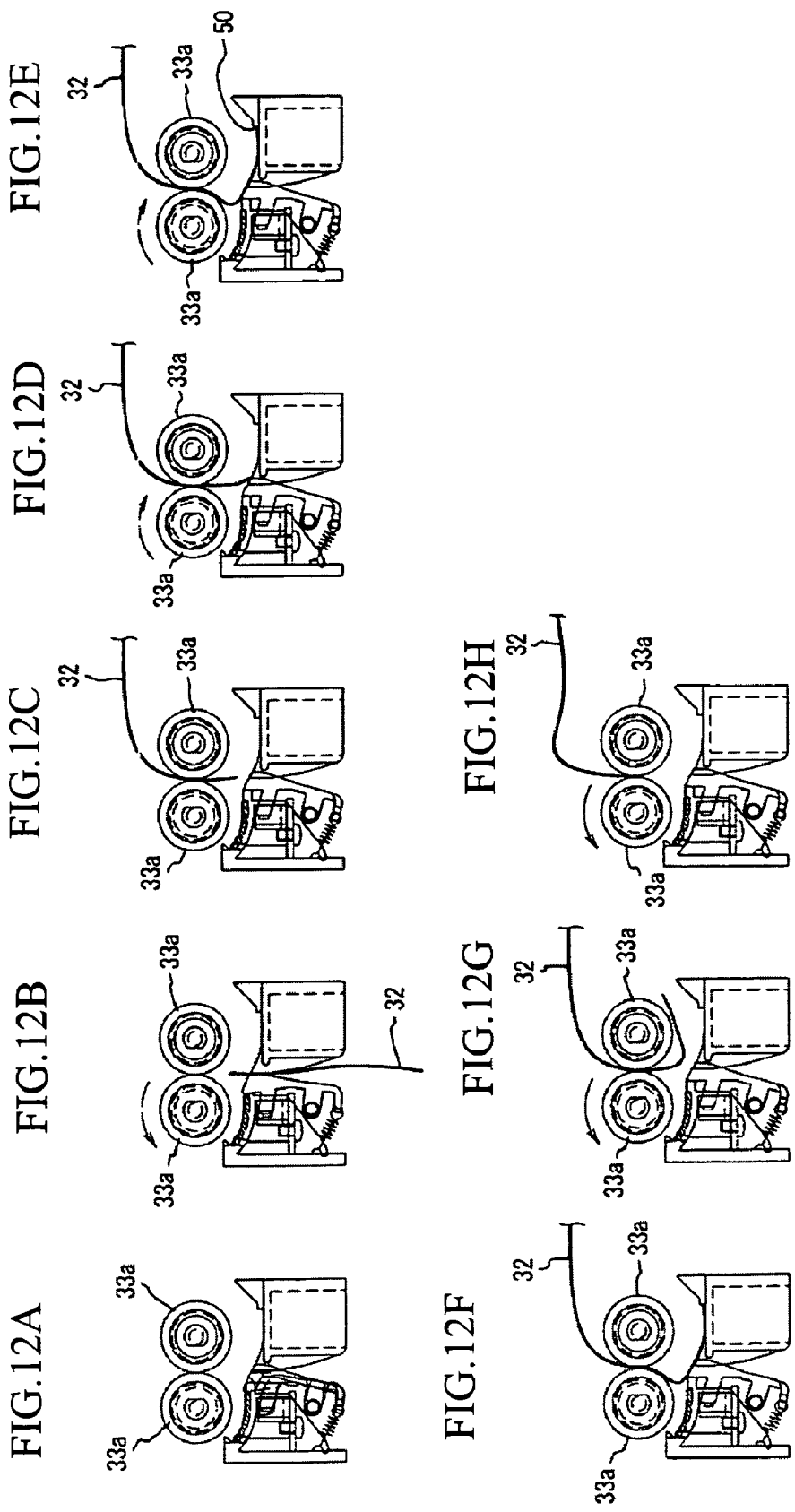
FIGS. 12A-12H are explanation views, wherein the sheet-shaped member is bent by the bending unit.

When the sheet-shaped member 32 is moved backward, firstly the rear end of the sheet-shaped member 32 contacts the sloped guide section 44 as shown in FIG. 12D, next the rear end of the sheet-shaped member 32 is moved backward along the sloped guide section 44 as shown in FIG. 12, and the rear end contacts the stopper 50 as shown in FIG. 12E, so that the movement of the sheet-shaped member along the sloped guide section 44 is stopped.

By further rotating the feed rollers 33a and 33a in the reverse direction, the rear end of the sheet-shaped member 32 is slightly fed toward the feed roller 33a located on the upstream side, so that the deformity formed in the rear end part of the sheet-shaped member 32 is emphasized.

Since the sloped guide section 44 is inclined from the upstream side to the downstream side so as to gradually separate from the roller 33a located on the downstream side, the rear end part of the sheet-shaped member 32 is concaved toward the roller 33a located on the downstream side. The shape of the deformity 32b may be formed into, for example, an L-shape or a rounded surface by changing the distance of the backward movement of the sheet-shaped member 32, the shape of the surface of the sloped guide section 44, etc.

After the motor is rotated the prescribed angle in the reverse direction, the control section rotates the feed rollers 33a and 33a in the normal direction so as to feed the sheet-shaped member 32, in which the deformity has been formed in the rear end part, into the blower duct 22.

Since the rear end part of the sheet-shaped member 32 is concaved toward the roller 33a on the downstream side to form the deformity 32b, the deformity 32b is not restored even if the rear end part of the sheet-shaped member 32, in which the deformity 32b has been formed, is passed between the rollers 33a and 33a. Namely, the front end part of the sheet-shaped member 32 is bent, by the air stream, in the direction equal to the deforming direction of the deformity 32b or in the air-streaming direction as shown in FIG. 12G, so that the rear end of the sheet-shaped member 32 passes along the roller 33a located on the downstream side and the deformity 32b can be maintained without restoring.

In the present embodiment, if the rear end part of the sheet-shaped member 32 is concaved toward the roller 33a located on the upstream side, the deformity 32b is improperly restored when the deformity 32b passes between the rollers 33a and 33a.

Figure 3:
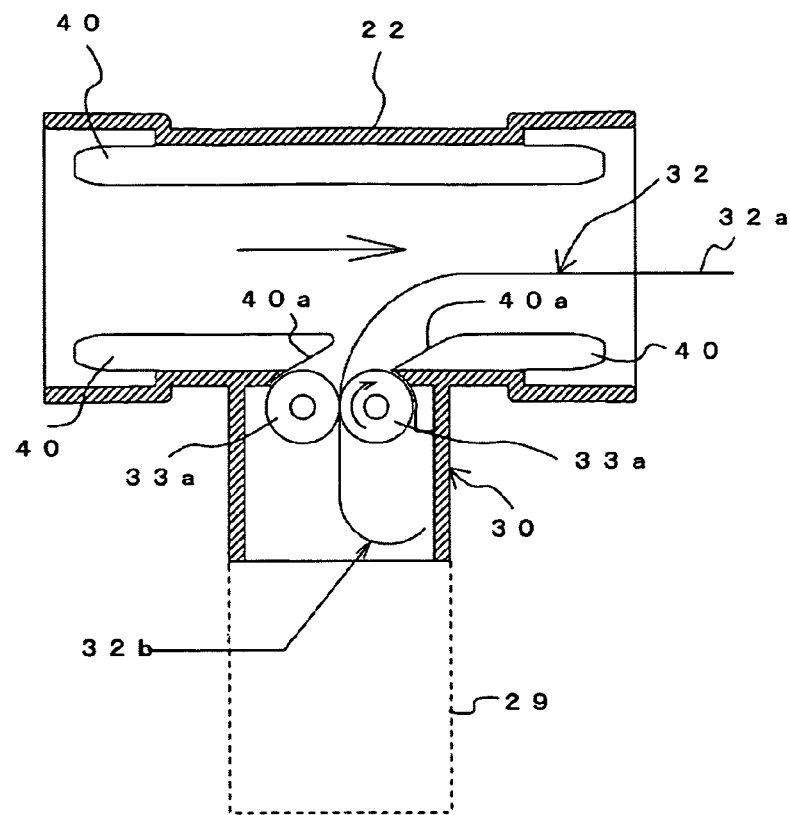
FIG. 3 is an explanation view showing an outline of a bending unit.

Note that, the ribs 40 formed from the bending unit 30 to the inlet of the blower duct may have sloped end faces 40a whose height is gradually increased in the air-streaming direction, as shown in FIG. 3, so as not to engage the front end or the rear end of the sheet-shaped member 32 with the end faces of the ribs 40 when the sheet-shaped member 32 is sent from the bending unit 30 to the blower duct 22.

A connecting part of the blower duct 22, to which the bending unit 30 (the sheet feeding unit 28), may be integrated with the bending unit 30 and connected to the straight part of the blower duct 22.

The sheet feeding unit 28 need not have the banknote identification unit 29. The sheet-shaped members may be manually supplied to or supplied to the feed rollers 33a and 33a of the bending unit 30 by, for example, a belt mechanism or a roller mechanism.

Figure 13:
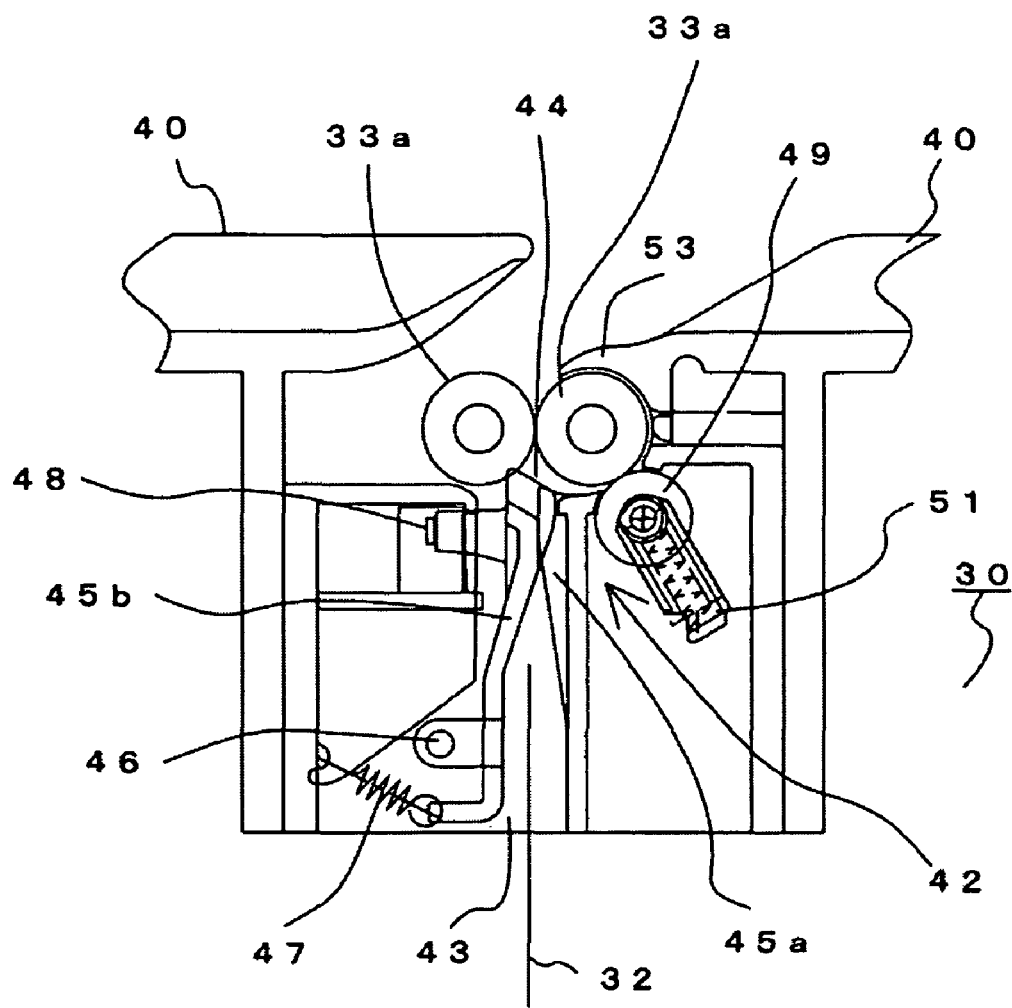
FIG. 13 is an explanation view of another example of the bending unit.
Figure 14:
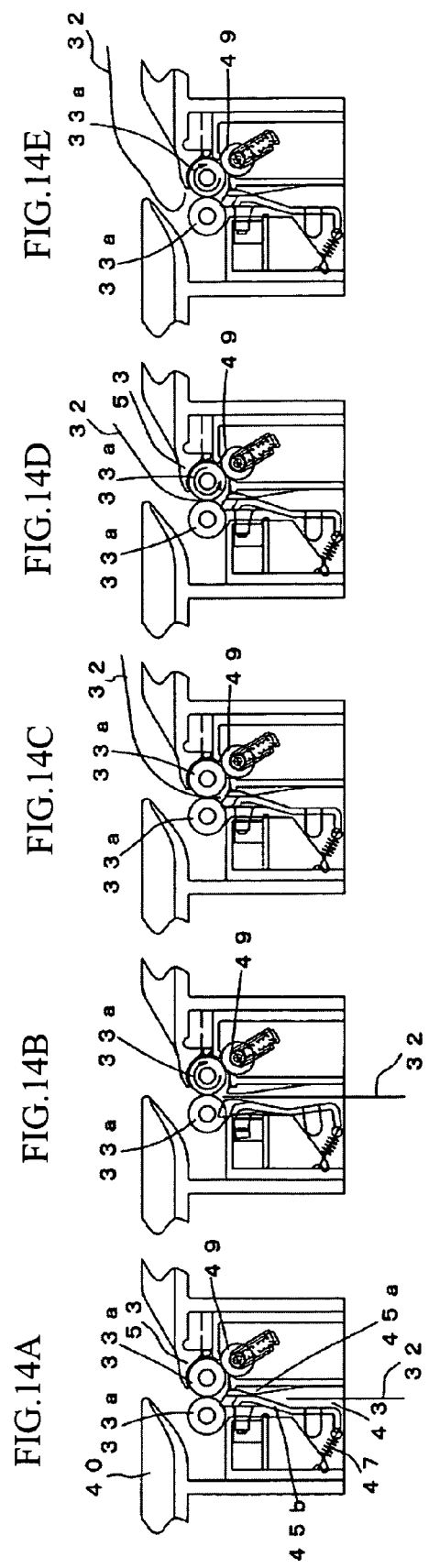
FIGS. 14A-14E are explanation views, wherein the sheet-shaped member is bent by the bending unit shown in FIG. 13.

Next, another bending unit 30 will be explained with reference to FIGS. 13 and 14.

Note that, the structural elements shown in FIGS. 10-12 are assigned the same symbols and explanation will be omitted.

In the present embodiment, a press roller 49 contacts one of the feed rollers 33a and 33a, which is located on the downstream side. The press roller 49 is pressed onto the feed roller 33a located on the downstream side by elasticity of a spring 51. A guide section 53 having an arc face is provided adjacent to the press roller 49, and the sheet-shaped member 32 can be passed through a small space between the arc face and an outer circumferential face of the feed roller 33a located on the downstream side.

The action of the bending unit 30 will be explained with reference to FIG. 14.

In FIG. 14A, the sheet-shaped member (banknote) is put in the banknote identification unit 29 and identified thereby, at that time the feed rollers 33a and 33a are not rotated.

When the identified sheet-shaped member is sent toward the feed rollers 33a and 33a by rollers (not shown), the front end of the sheet-shaped member 32 turns the movable claw piece 45b against the elasticity of the spring 47, so that the lever 45c masks (turns off) the sensor 48. When the OFF signal of the sensor is inputted to the control section, not shown, the control section drives the motor, not shown, so as to rotate the feed rollers 33a and 33a in the sheet feeding direction (see FIG. 14B).

When the sheet-shaped member 32 is fed by the feed rollers 33a and 33a and the rear end of the sheet-shaped member 32 passes the claw pieces 45a and 45b as shown in FIG. 14C, the movable claw piece 45b is returned to the initial position by the elasticity of the spring 47, so that the path 43 is closed by the claw pieces 45a and 45b, the sensor 48 is returned to a light receiving state (turned on) and the ON signal is inputted to the control section.

By inputting the ON signal to the control section, the control section stops the motor once, and then the motor is rotated a prescribed angle in the reverse direction. With this action, the sheet-shaped member 32 is moved a prescribed distance backward (see FIG. 14D).

When the sheet-shaped member 32 is moved backward, the rear end of the sheet-shaped member 32 contacts the sloped guide section 44, the rear end of the sheet-shaped member 32 is moved backward along the sloped guide section 44, pinched between the press roller 49 and the feed roller 33a and further moved backward, so that the rear end part is fed between the rollers 33a and 33a so as to form into a cylindrical shape.

After the motor is rotated the prescribed angle in the reverse direction, the control section rotates the feed rollers 33a and 33a in the normal direction so as to feed the sheet-shaped member 32, in which the deformity 32b has been formed in the rear end part, into the blower duct 22 as shown in FIG. 14E.

The shape of the deformity 32b may be formed into, for example, an L-shape, a J-shape or a cylindrical shape by changing the distance of the backward movement of the sheet-shaped member 32.

Figure 16:
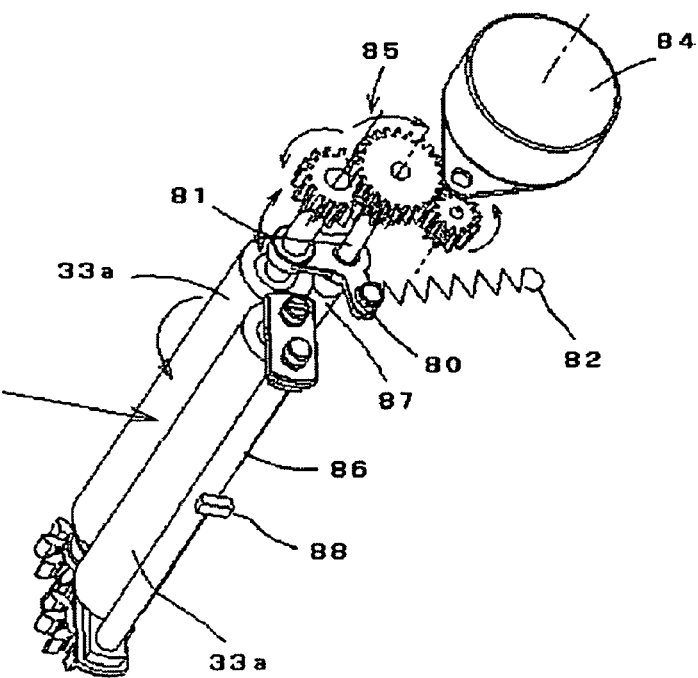
FIG. 16 is a detailed explanation view of feed rollers.
Figure 17:
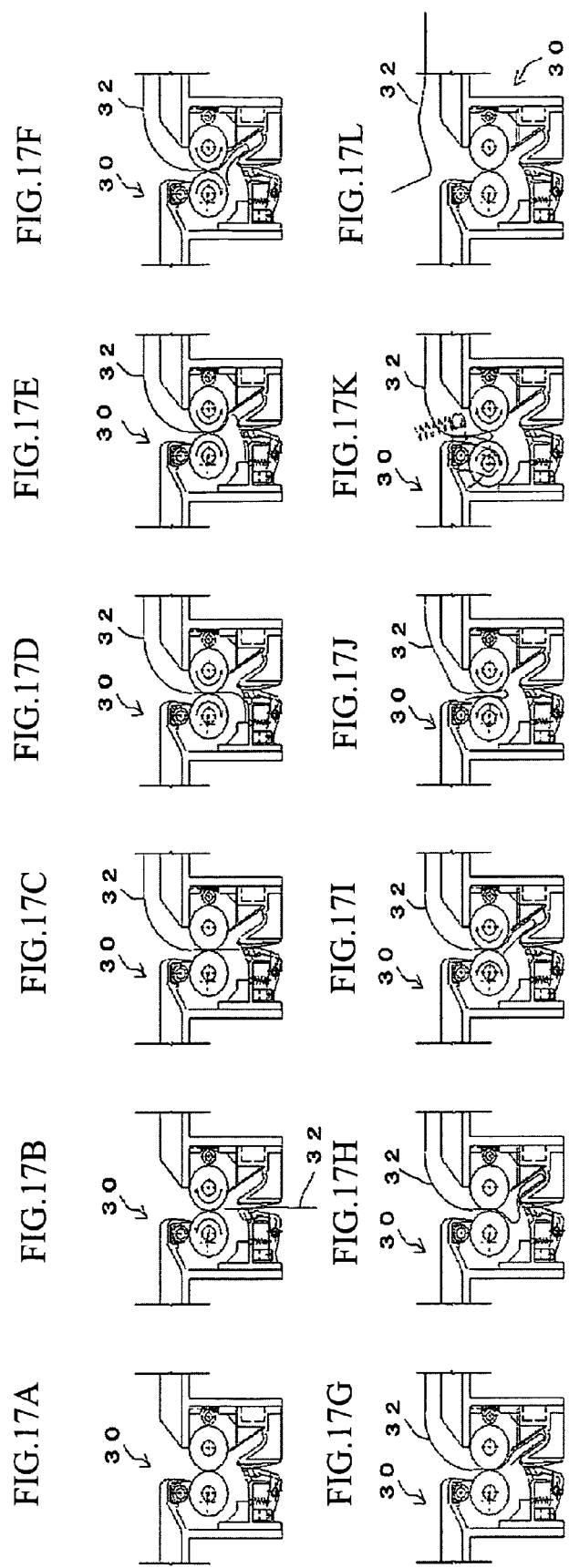
FIGS. 17A-17L are explanation views, wherein the sheet-shaped member is bent by the bending unit shown in FIG. 15.

A further example of the bending unit 30 will be explained with reference to FIGS. 15-17.

Note that, the structural elements shown in FIGS. 10-12 are assigned the same symbols and explanation will be omitted.

In the present example, one of the feed rollers 33a and 33a located on the upstream side is attached to one ends of a pair of L-shaped swing arms 80, which can be swung about a shaft 81, one end of a spring 82 is fixed to the other ends of the swing arms 80, and the feed roller 33a on the upstream side is pressed onto the feed roller 33a on the downstream side by the spring 82. Note that, one of the L-shaped swing arms 80 is not shown in the drawing, and the other side of the feed roller 33a on the upstream side is rotatably held thereby.

Details of the feed rollers 33a and 33a will be explained with reference to FIG. 16.

A drive motor 84 rotates the feed roller 33a located on the upstream side with a change-gear set 85. Note that, shield shafts 86 and 87 are arranged in parallel with the feed rollers 33a and 33a and separated from the feed rollers 33a and 33a with minute gaps. A boss 88 is formed at an axial center of the shield shaft 86, and the boss 88 is received by a supporting section of a main body part, so that the shield shaft 86 and the feed roller 33a on the downstream side can be moved like a tilting board and can maintain the parallel state with the feed roller 33a on the upstream side. With this structure, the sheet-shaped member 32 can be securely fed with pinching the sheet-shaped member by the both rollers 33a and 33a.

Figure 15:
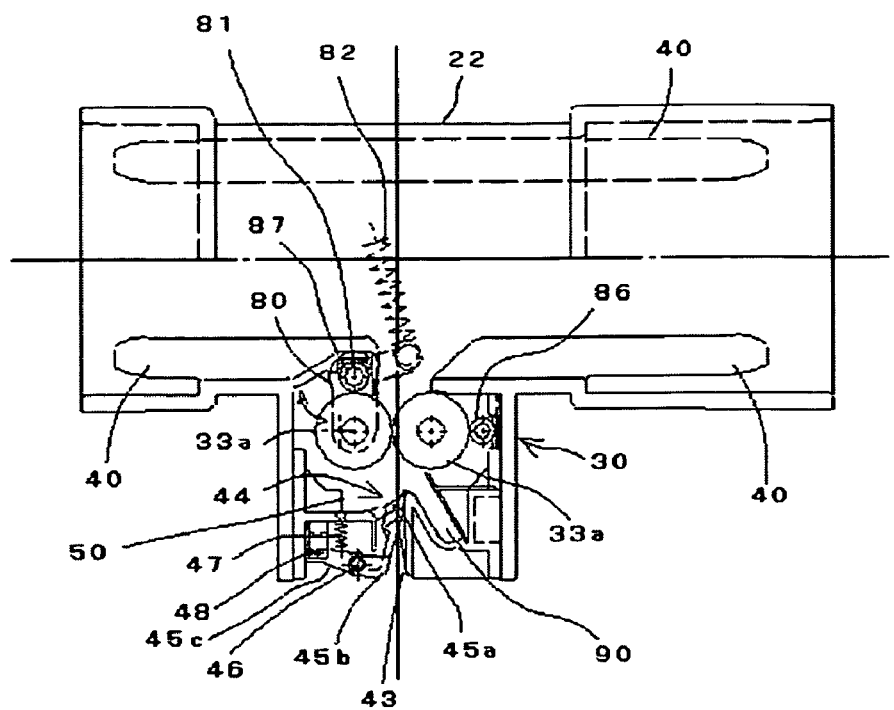
FIG. 15 is an explanation view of another example of the bending unit.

In FIG. 15, the sloped guide section 44 is extended toward the feed roller 33a on the upstream side and gradually separated away from the blower duct 22, and the stopper 50 is formed at the end thereof. A pouched section 90, which is extended toward the feed roller 33a on the downstream side and immediately separated away from the blower duct 22, is provided on the downstream side of the sloped guide section 44.

The action of the bending unit 30 will be explained with reference to FIG. 17.

In FIG. 17A, the sheet-shaped member (banknote) is put in the banknote identification unit 29 and identified thereby, at that time the feed rollers 33a and 33a are not rotated.

When the identified sheet-shaped member is sent toward the feed rollers 33a and 33a by rollers (not shown), the front end of the sheet-shaped member 32 turns the movable claw piece 45b against the elasticity of the spring 47, so that the lever 45c turns on the sensor 48.

When the ON signal of the sensor is inputted to the control section, not shown, the control section drives the motor 84 so as to rotate the feed rollers 33a and 33a in the sheet feeding direction (see FIG. 17B).

When the sheet-shaped member 32 is fed by the feed rollers 33a and 33a and the rear end of the sheet-shaped member 32 passes the claw pieces 45a and 45b as shown in FIG. 17C, the movable claw piece 45b is returned to the initial position by the elasticity of the spring 47, so that the path 43 is closed by the claw pieces 45a and 45b, the sensor 48 turned off and the OFF signal is inputted to the control section.

By inputting the OFF signal to the control section, the control section stops the motor 84 once, and then the motor 84 is rotated a prescribed angle in the reverse direction. With this action, the sheet-shaped member 32 is moved a prescribed distance backward. By moving the sheet-shaped member 32 backward, the rear end of the sheet-shaped member 32 contacts the sloped guide section 44, the rear end of the sheet-shaped member 32 is moved backward along the sloped guide section 44 and contacts the stopper 50 (see FIG. 17D).

By further rotating the motor 84 in the reverse direction, the rear end part of the sheet-shaped member 32 is gradually moved into the pouched section 90 along an inner face of the pouched section 90, so that the rear end part is folded into two (see FIGS. 17E-17G). By further continuously rotating the motor 84 in the reverse direction, the sheet-shaped member 32, which has been once moved backward, another deformity is formed by curving a mid part of the sheet-shaped member 32 as shown in FIG. 17H. By further rotating the motor 84 in the reverse direction, the deformity is emphasized. In this state, the motor 84 is stopped. Note that, the motor 84 is a stepping motor, which stops the rotation when the rotational angle reaches the prescribed angle.

Next, the motor 84 is rotated in the normal direction again. With this action, the two-folded rear end part of the sheet-shaped member 32 is fed between the feed rollers 33a and 33a as shown in FIGS. 17I and 17J. By further rotating the motor 84, a loop-shaped folded end of the sheet-shaped member 32 passes the feed rollers 33a and 33a, and a resistance force from the sheet-shaped member 32 turns and moves the feed roller 33a on the upstream side away from the feed roller 33a on the downstream side against the elasticity of the spring 82 (see FIG. 17K).

With this action, a suitable pressing force is applied to the loop-shaped folded end of the sheet-shaped member 32 when the end passes between the feed rollers 33a and 33a, so that the rear end part of the sheet-shaped member can be firmly projected toward the feed rollers 33a and 33a as shown in FIG. 17L. However, when the loop-shaped folded end passes, one of the feed rollers 33a is moved away, so the loop-shaped folded end is not perfectly linearly folded. In case of conveying banknotes, if the loop-shaped folded ends are perfectly linearly folded, it is difficult to restore the ends; in the present embodiment, the firm deformity is formed but not perfectly folded.

As shown in FIG. 17L, the sheet-shaped member 32 is formed into a zigzag shape by forming the two deformities.

The elasticity of the spring 82 and an angle of the L-shaped swing arms 80 are designed to turn and move the feed roller 33a on the upstream side away from the feed roller 33a on the downstream side against the elasticity of the spring 82 when the loop-shaped folded end passes. The angle of the L-shaped swing arms 80 is designed to press the feed roller 33a on the upstream side onto the feed roller 33a on the downstream side by a frictional force of the sheet-shaped member 32 while the feed roller 33a on the upstream side is rotated in the reverse direction as shown in FIGS. 17D-17G.

In the above described embodiment, the feed roller 33a on the upstream side is movable, but the feed roller 33a on the downstream side may be movable, the positions of the stopper 50 and the pouched section 90 may be counterchanged, the sloped guide section 44 may be inclined in the opposite direction, and the rear end part of the sheet-shaped member 32 may be concaved toward the feed rollers 33a and 33a.

Figure 18:
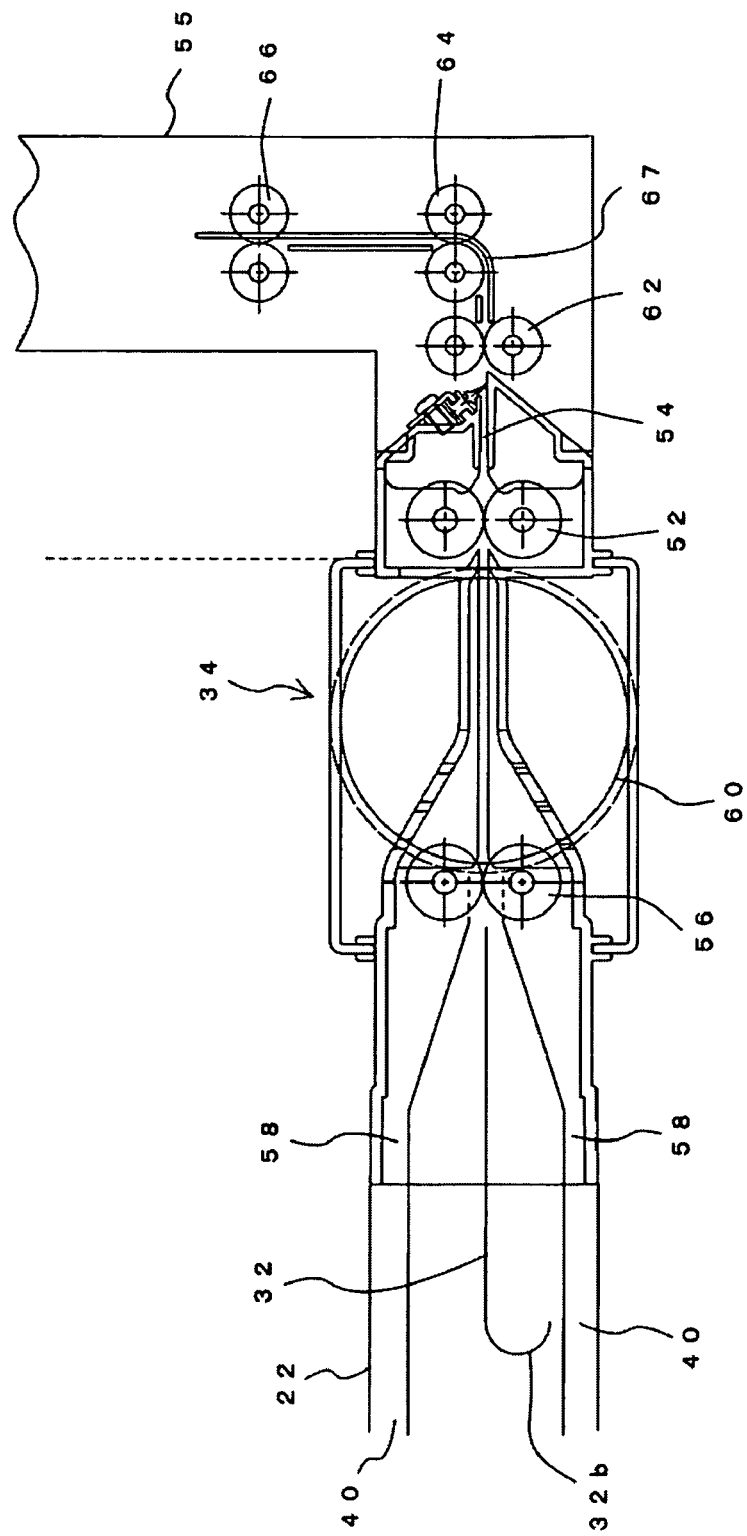
FIG. 18 is a plan view of a collecting unit.
Figure 19:
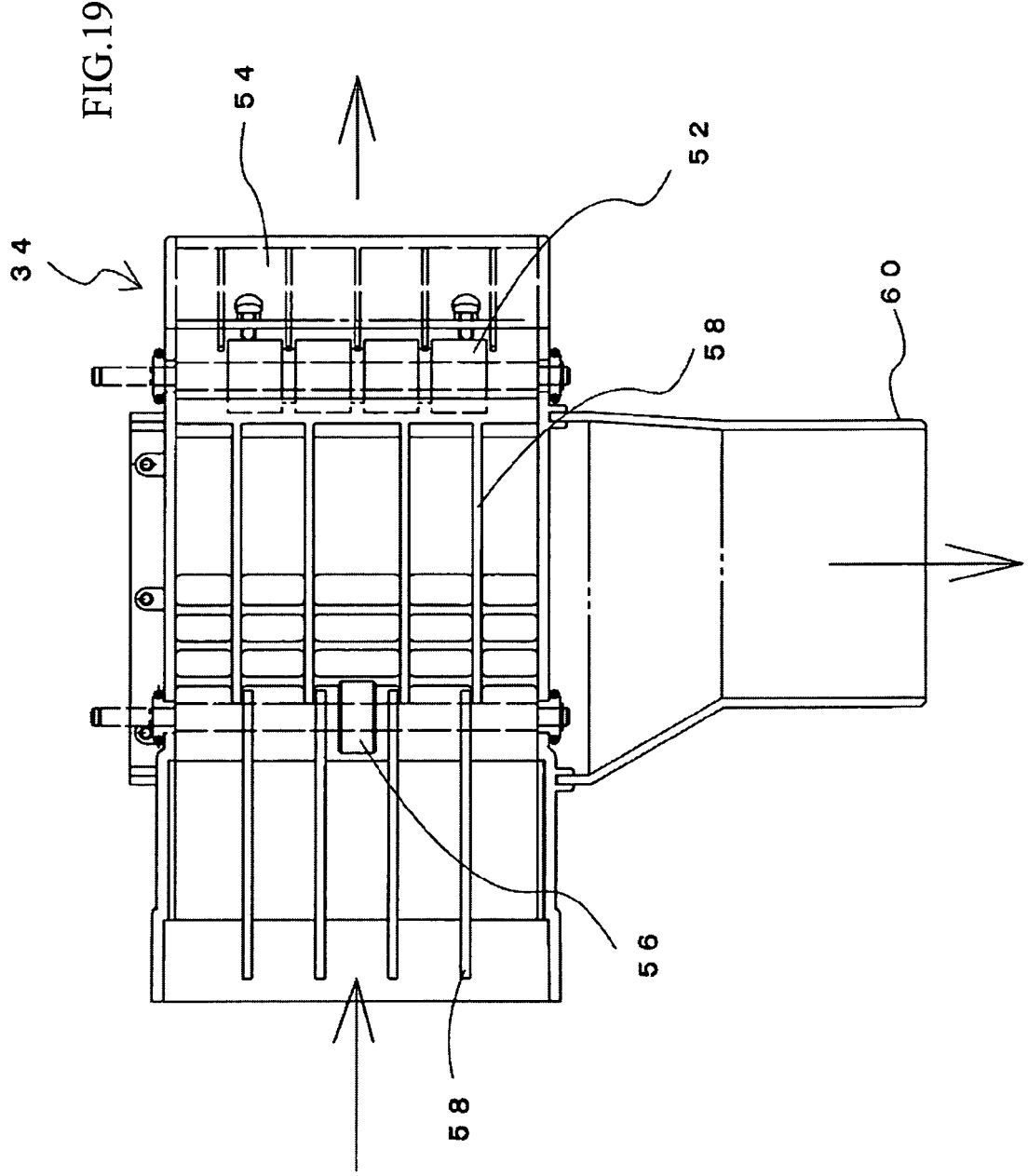
FIG. 19 is a side view of the collecting unit.

Next, details of the unit 34 for collecting the sheet-shaped members 32 will be explained with reference to FIGS. 18 and 19.

The collecting unit 34 is detachably attached to the end of the blower duct 22 and collects the sheet-shaped members (banknotes) 32 conveyed in the blower duct 22.

Conveying rollers 52 are provided at a mid part of the collecting unit 34, pinch the sheet-shaped member 32 from the both sides and sends it toward a slit 54. As shown in FIG. 19, four pairs of the conveying rollers 52 are provided so as to pinch the entire sheet-shaped member 32 in the width direction.

A pair of pinch rollers 56 are provided on the upstream side of the conveying rollers 52. The pinch rollers 56 firstly pinch the front end part of the sheet-shaped member 32 conveyed in the blower duct 22 in various postures.

Ribs 58 are connected to the ribs 40 formed in the blower duct 22, their height is gradually increased toward the pinch rollers 56, and a small gap, through which the sheet-shaped member 32 can be passed, is formed between front ends of the ribs 58 on the upstream side of the pinch rollers 56, so that the front end of the sheet-shaped member 32 can be securely introduced to the pinch rollers 56. A discharge pipe 60 is connected to the return duct 36 so as to return the air to the blower section 24. Therefore, a part of the air stream can be circulated.

Note that, the air may be discharged from the discharge pipe 60 without returning to the blower section 24.

A collecting box 55 is provided on the downstream side of the pinch rollers 56.

First rollers 62, which pinch the front end part of the sheet-shaped member 32, which has been conveyed through the slit 54 by conveying rollers 54, is provided in the collecting box 55 and located at an outlet of the slit 54. Second rollers 64 are provided near the first rollers 62 and arranged perpendicular to the first rollers 62. Further, third rollers 66 are provided on the downstream side. Guide plates 67 are provided along the first rollers 62, the second rollers 64 and the third rollers 66 and perpendicularly bent near the second rollers 64. The guide plates 67 are arranged parallel, so that the side edges of the sheet-shaped member 32 are guided therebetween.

The first rollers 62, the second rollers 64 and the third rollers 66 constitute restoring rollers.

The front end part of the sheet-shaped member 32, which has been conveyed through the slit 54, is pinched by the first rollers 62 and sent forward, and the both side edges of thereof are guided by the guide plates 67 so that the sheet-shaped member is pinched by the second rollers 64. The sheet-shaped member 32 is further guided by the guide plate 67, pinched by the third rollers 66 and conveyed into the collecting box 55. The guide plates 67 are perpendicularly bent in the opposite direction with respect to the deforming direction of the deformity 32b of the sheet-shaped member 32. Therefore, the deformity 32b is bent in the opposite direction when the sheet-shaped member 32 is passed through the second rollers 64, so that the deformity can be restored and the flat sheet-shaped member 32 can be collected in the collecting box 55.

The deformity 32b of the sheet-shaped member 32 has been temporarily deformed by the bending unit 30, so the deformity can be easily restored by compulsorily bending in the opposite direction by the second rollers 64.

Figure 20:
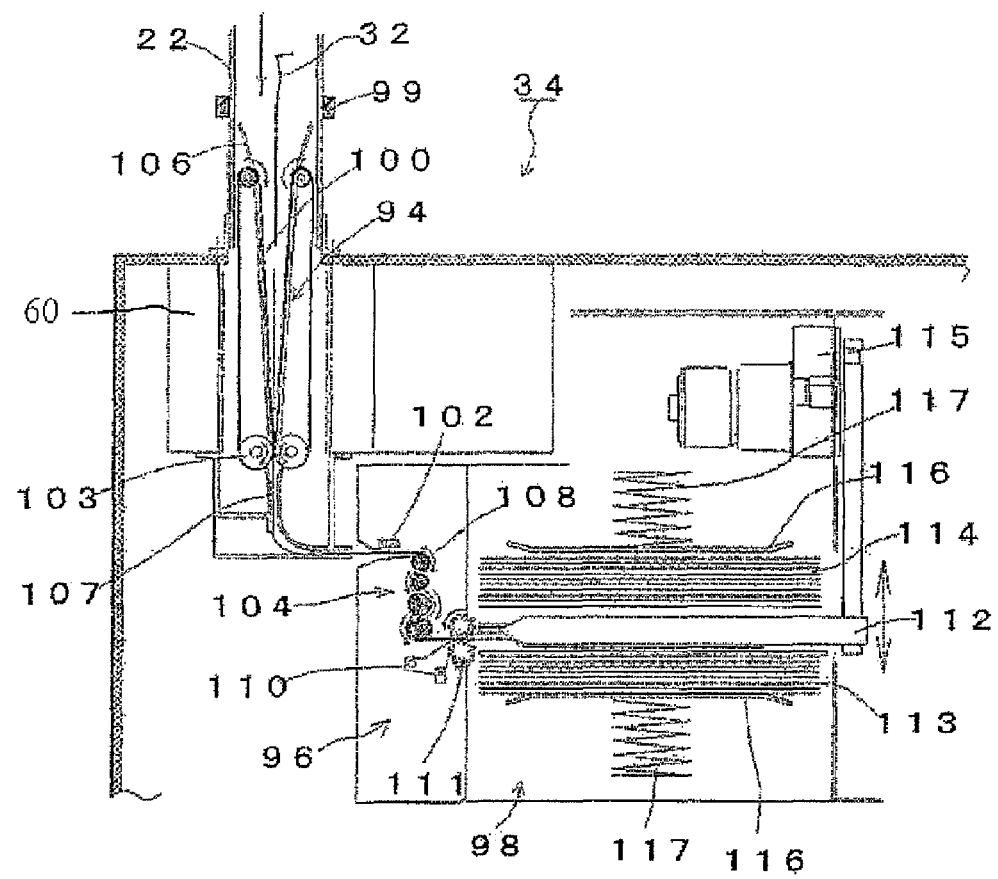
FIG. 20 is a plan view of another collecting unit.
Figure 21:
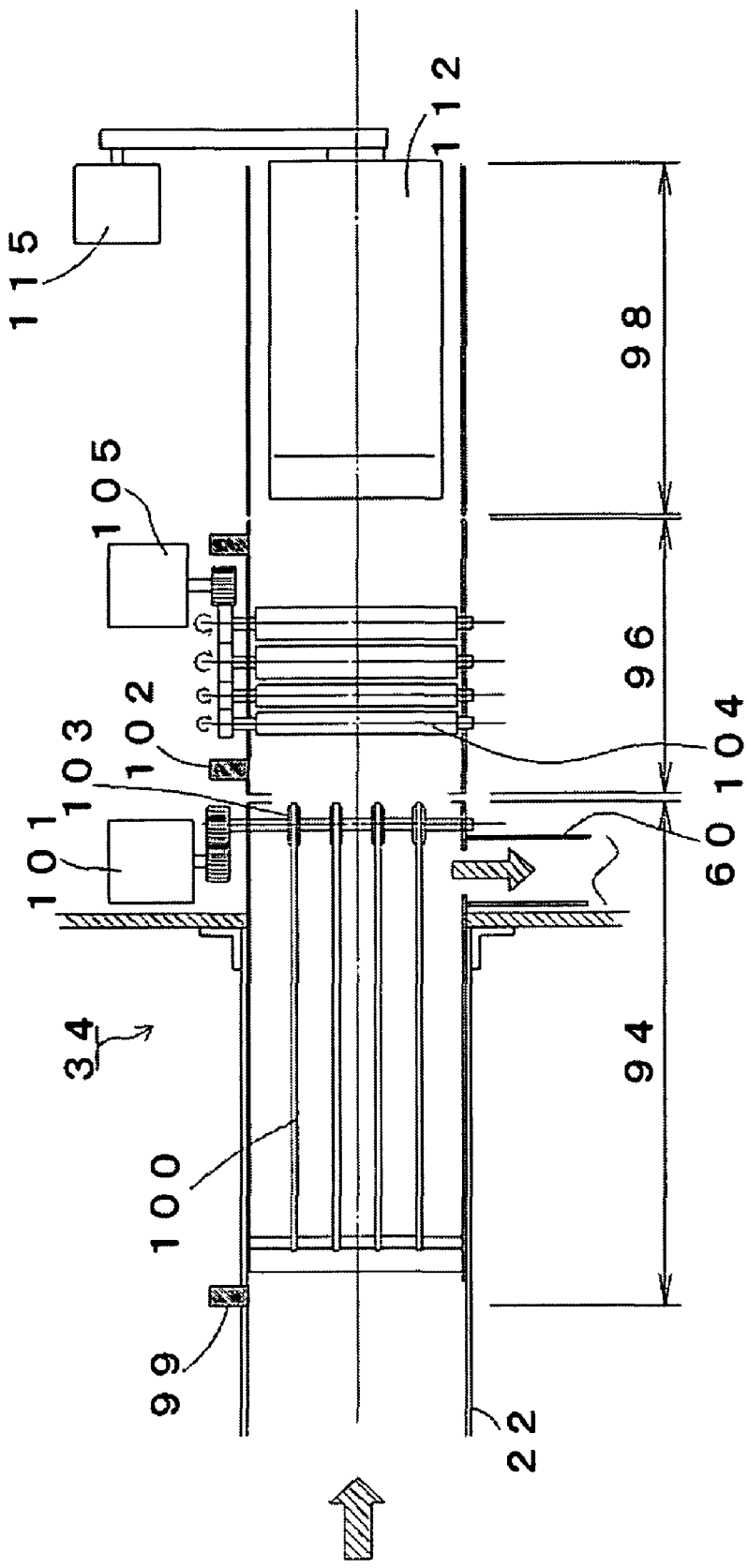
FIG. 21 is a front view of another collecting unit.

Another unit 34 for collecting the sheet-shaped members 34 will be explained with reference to FIGS. 20 and 21, FIG. 20 is a plan view and FIG. 21 is a front view.

In the drawings, a symbol 94 stands for a sheet separating section, a symbol 96 stands for a sheet restoring section, and a symbol 98 stands for a sheet accommodating section.

The sheet separating section 94 is provided to the end of the blower duct 22 so as to separate the sheet-shaped member 32 from the air stream. A sheet detecting sensor 99 is provided at an inlet of the sheet separating section 94.

A pair of belts 100 are provided in the sheet separating section 94. A symbol 101 stands for a drive motor. A distance between opposite conveying faces of the belts 100 are gradually reduced like a V-shape, the belts pinch the sheet-shaped member 32, which has been conveyed in the blower duct 22, so as to feed the sheet-shaped member to the sheet restoring section located on the downstream side. The belts 100 are respectively engaged with pulleys 103, which are connected with a one-way clutch mechanism (not shown), and the sheet-shaped member 32 can be pulled out toward the sheet restoring section 96 even if the motor 101 is stopped.

The discharge pipe 60 discharges only the air stream outside. The discharge pipe 60 is connected to the return duct 36 so as to return the air stream to the blower section 24. Therefore, a part of the air stream can be circulated.

Note that, the air may be discharged from the discharge pipe 60 without returning to the blower section 24. A symbol 106 stands for a guide plate.

A pair of the guide plates 106 are provided on the downstream side of the belts 100 so as to introduce the sheet-shaped member 32 to the sheet restoring section 96.

An inlet sensor 102 is provided at an inlet of the sheet restoring section 96. Four restoring rollers 104 are provided in the sheet restoring section 96, and the sheet-shaped member 32 can be passed between the adjacent restoring rollers. A sheet feeding space is formed between outer circumferential faces of the restoring rollers 104 and guide plates 108, which have arc-shaped cross sections and which respectively cover the outer circumferential faces of the restoring rollers 104.

A motor 105 drives the restoring rollers 104. Gears, which are respectively fixed to a motor shaft of the motor 105 and shafts of the restoring rollers 104, are mutually engaged, so that the adjacent restoring rollers 104 are rotated in the opposite directions. With this structure, the sheet-shaped member 32, which has been fed to the restoring rollers 104, is conveyed zigzag and bent in the opposite directions, so that the curl of the sheet-shaped member is restored until reaching an inlet of the sheet accommodating section 98.

An end detecting switch 110 and a pair of feed rollers 111 are provided at an inlet of the sheet accommodating section 98.

An inner space of the sheet accommodating section 98 is divided into two spaces, which are a first space 113 and a second space 114, by a movable press plate 112. The press plate 112 is moved in the sheet accommodating section 98 by a motor 115, and the sheet-shaped member 32 can be sent to the second space 114 via the inlet when the press plate is moved to one position (a front side in FIG. 20); the sheet-shaped member 32 can be sent to the first space 113 when the press plate is moved to the other position (an inner side).

Note that, receiving plates 116 are respectively provided in the first space 113 and the second space 114, and they are respectively biased by springs 117.

Next, the action will be explained.

When the sheet detecting sensor 99 detects the sheet-shaped member 32, the motor 101 is driven so as to drive the belts 100 and feed the sheet-shaped member 32 to the sheet restoring section 96. When the inlet sensor 102 detects the sheet-shaped member 32, the motor 101 is stopped, the motor 105 is started to rotate the four restoring rollers 104, the sheet-shaped member 32 is conveyed between the restoring rollers 104 and alternately bent several times, so that the flattened sheet-shaped member is sent to the sheet accommodating section 98. When the end detecting switch 110 detects the rear end of the sheet-shaped member 32, the motor 105 is stopped. Note that the rollers 111 and 104 are simultaneously driven and stopped.

In the sheet accommodating section 98, the press plate 112 has been moved to one side (the inner side in FIG. 20), so the sheet-shaped member 32 is fed into the first space 113 from the inlet. When the end detecting switch 110 detects passing the rear end of the sheet-shaped member 32, the motor 115 is started to move the press plate 112 toward the first space 113 and press the sheet-shaped member 32 onto the receiving plate 116. The press plate 112 is stopped in this state, so that another sheet-shaped member 32 can be fed into the second space 114 from the inlet, and then another sheet-shaped member 32 is fed into the second space 114 and accommodated. The sheet-shaped members 32 are alternately fed into the first space 113 and the second space 114 and accommodated therein.

Since the press plate 112 is moves so as to alternately accommodate the sheet-shaped members 32 in the first space 113 and the second space 114, the press plate 112 need not reciprocally moved every time the sheet-shaped member 32 is accommodated so that takt can be shortened. Note that, the sheet accommodating section 98 may have one accommodating space, and the press plate 112 may be reciprocally moved every time the sheet-shaped member 32 is accommodated.

In case of conveying the sheet-shaped members 32 by an air stream, two sheet-shaped members 32 will be stuck and conveyed.

When the inlet sensor 102 detects the front end of the preceding sheet-shaped member 32, the motor 101 is stopped. On the other hand, the motor 105 is started, so that the preceding sheet-shaped member 32 is send forward by the restoring rollers 104. Even if the rear end part of the preceding sheet-shaped member 32 is pinched by the belts 100, the pulleys 103 are connected with the one-way clutch, so the preceding sheet-shaped member 32 can pass through the belts 100 without failure and the preceding sheet-shaped member 32 is fed forward together with the following sheet-shaped member 32.

When the preceding sheet-shaped member 32 passes through the belts 100, the preceding sheet-shaped member 32 is separated from the following sheet-shaped member 32. Further, when the banknote sensor 99 detects a further following sheet-shaped member 32, the motor 101 is driven to convey the following sheet-shaped member 32 forward by the belts 100.

In case that the following sheet-shaped member 32 reaches the restoring rollers 104 together with the preceding sheet-shaped member 32, they are conveyed to and accommodated in the sheet accommodating section 98 in the stuck state.

In the embodiment shown in FIG. 1, the blower duct 22 has the tuning section 23, in which the sheet-shaped member 32 is curled and U-turned so as to convey and accommodate the sheet-shaped member 32. In this case, the curvature radius of the turning section 23 is small.

Figure 22:
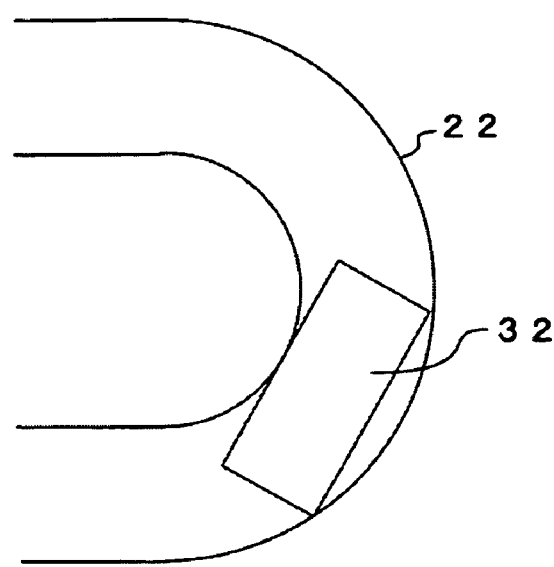
FIG. 22 is an explanation view, wherein the sheet-shaped member, whose transverse ends are bent inward, is conveyed.

In another case, the sheet-shaped member 32 must be turned to face the side edges of the sheet-shaped member 32 inward due to a layout of the blower duct 22. However, in this case, the curvature radius of the turning section must be great as shown in FIG. 22, and a space efficiency must be lowered.

Figure 23:
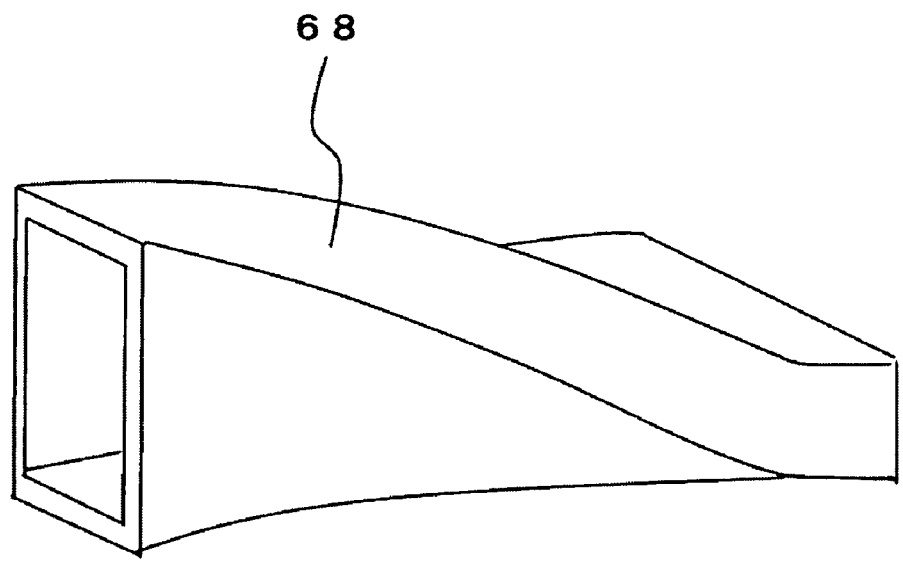
FIG. 23 is an explanation view of a twisted duct.

FIG. 23 shows means for solving the above described problems.

In the shown example, a twisted duct 68, which is twisted a prescribed angle (e.g., 90 degrees in FIG. 23) with respect to an axial line of the blower duct 22, is used. The ribs 40, which correspond to the ribs formed in the wall faces of the blower duct 22, are formed in wall faces of the twisted duct 68 and twisted at the same angle, but they are not shown in FIG. 23. By connecting the twisted duct 68 to the straight part of the blower duct 22, the sheet-shaped member 32 can be turned 90 degrees.

Figure 24:
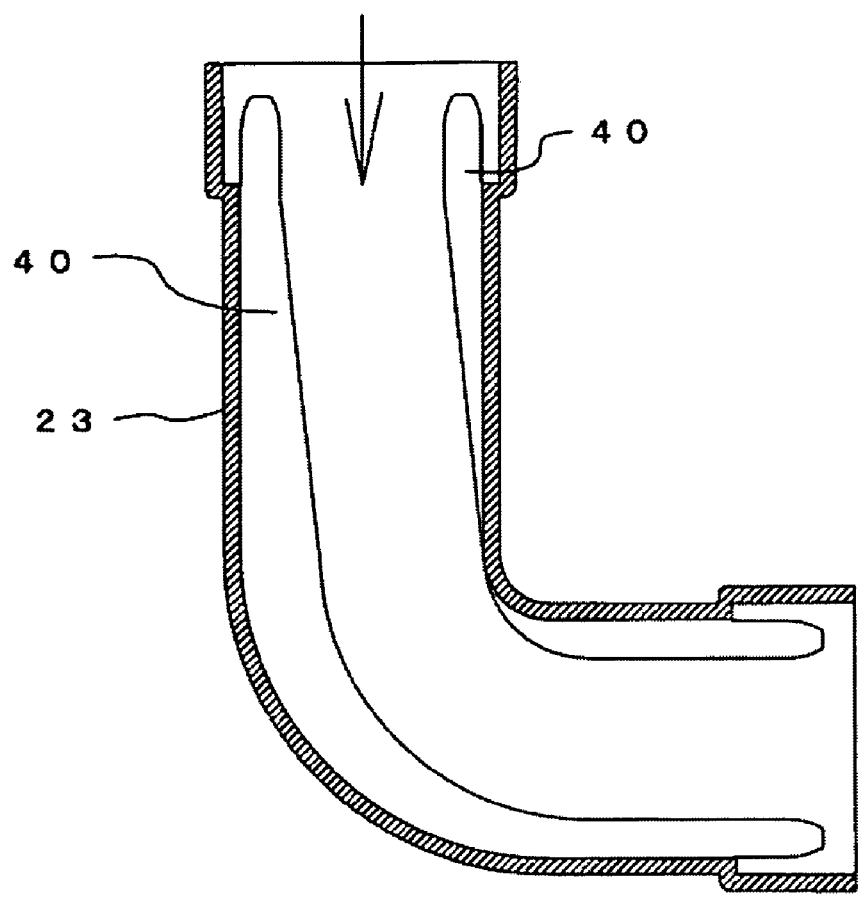
FIG. 24 is a sectional view of a bent duct, whose flow path is bent at the right angle.

In FIG. 24, the turning section 23 curls the sheet-shaped member 32 and turns the conveying direction 90 degrees. A height of the ribs 40 formed in an inner wall face of the turning section 23 is gradually reduced from a specified position, which is located on the upstream side of the turning section 23 and separated a prescribed distance therefrom, to the turning section 23, and the height of the ribs 40 is gradually increased from the turning section 23 to a specified position, which is located on the downstream side of the turning section 23 and separated a prescribed distance therefrom, as well as the turning section 23 shown in FIG. 1. Further, preferably, a height of the ribs 40 formed in an outer wall face of the turning section 23 is gradually increased from a specified position, which is located on the upstream side of the turning section 23 and separated a prescribed distance therefrom, to the turning section 23, and the height thereof is gradually reduced from the turning section 23 to a specified position, which is located on the downstream side of the turning section 23 and separated a prescribed distance therefrom.

By connecting the twisted duct 68 shown in FIG. 23 and the turning section 23 shown in FIG. 24 to the straight part of the blower duct 22, the sheet-shaped member 32 can be turned, with the small curvature radius, to face the side edges of the sheet-shaped member 32 inward. By selecting the twist angle of the twisted duct 68 and the tuning angle of the turning section 23, the turned blower duct having the small curvature radius can be produced.

Other examples of the blower duct are shown in FIGS. 25-31.

Figure 25:
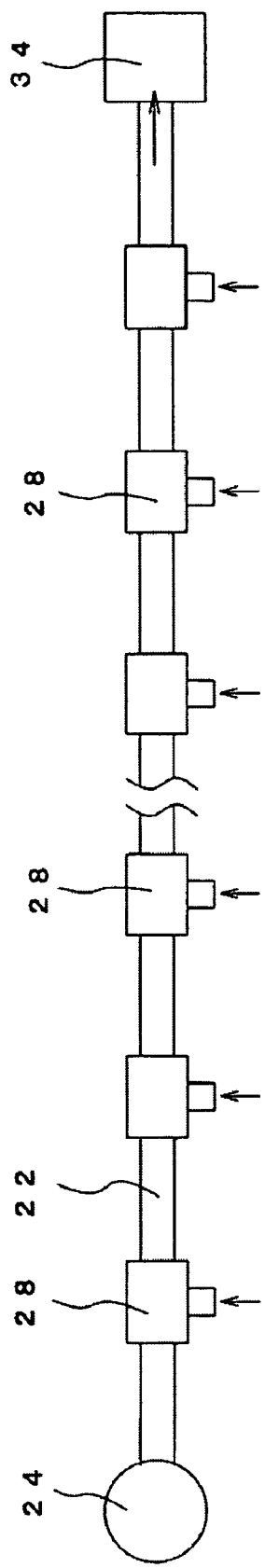
FIG. 25 is an explanation view of blower ducts linearly arranged.

In a system shown in FIG. 25, one blower section 24 is provided to the end of one blower duct 22, a plurality of the sheet feeding unit 28 are connected to the mid part of the blower duct, and the collecting unit 34 is provided to the other end of the blower duct 22. The structure is the same as that of the embodiment shown in FIG. 1.

This system has only one blower duct 22, and the air stream is generated by one blower section 24, so that the production cost of the this system can be lowered.

Note that, the sheet feeding units 28 may be provided on the both sides of the blower duct 22. This system can be suitably used in a game hall, e.g., pinball parlor, as an equipment for collecting sale proceeds.

Figure 26:
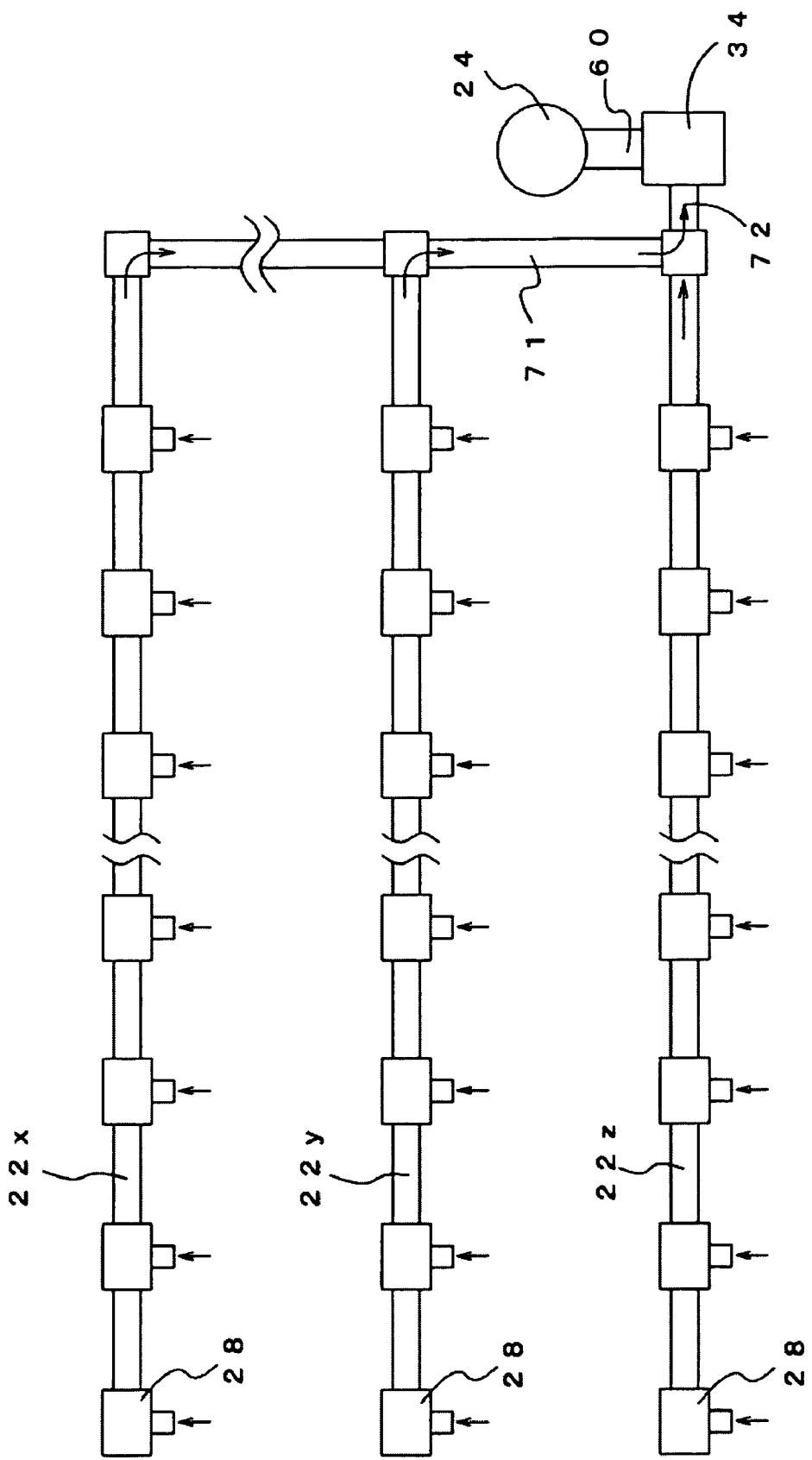
FIG. 26 is an explanation view of blower ducts arranged in parallel.

In a system shown in FIG. 26, the blower ducts 22 are arranged parallel. A plurality of the blower ducts 22 are connected to one collecting unit 34 so as to collect the sheet-shaped members.

This system can be suitably used in a game hall, in which a plurality of lines of game machines are arranged parallel.

In the drawing, the blower ducts 22x, 22y and 22z are respectively assigned to three lines x, y and z of the game machines, terminal ends of the blower ducts 22 are connected to one main duct 72. A flow passage area of the main duct 72 is equal to the sum of flow passage areas of the blower ducts 22.

A plurality of the sheet feeding units 28 are connected to each of the blower ducts 22.

The blower section (sucking blower) 24 is connected to the downstream side of the collecting unit 34 by the discharge pipe 60.

With this structure, the air streams, which have conveyed the sheet-shaped members 32 in the blower ducts 22, can be securely introduced into the main duct 72.

In the system shown in FIG. 26, the first blower duct 22x and the second blower duct 22y are connected to a branch duct 71, and the branch duct 71 and the third blower duct 22z are connected to the main duct 72. Therefore, a flow passage area of the branch duct 71 is equal to the sum of flow passage areas of the first and second blower ducts 22x and 22y. Further, the flow passage area of the main duct 72 is equal to the sum of flow passage areas of the branch duct 71 and the third blower duct 22z.

The sheet-shaped members are collected by the collecting unit 34, and the air streams are discharged outside via the discharge pipe 60 and the blower section 24.

Note that, the air streams may be returned from the blower section 24 to the blower ducts 22 via a return pipe (not shown) and a branch pipe (not shown). In this case, air-inlets for introducing external air may be provided. By circulating the air streams, even if the game hall in which the collecting unit 34 is installed is air-conditioned, the air in the blower ducts 22 will not be mixed with the conditioned air in the game hall, so that the sheet-shaped members can be conveyed without lowering air-conditioning efficiency.

Figure 27:
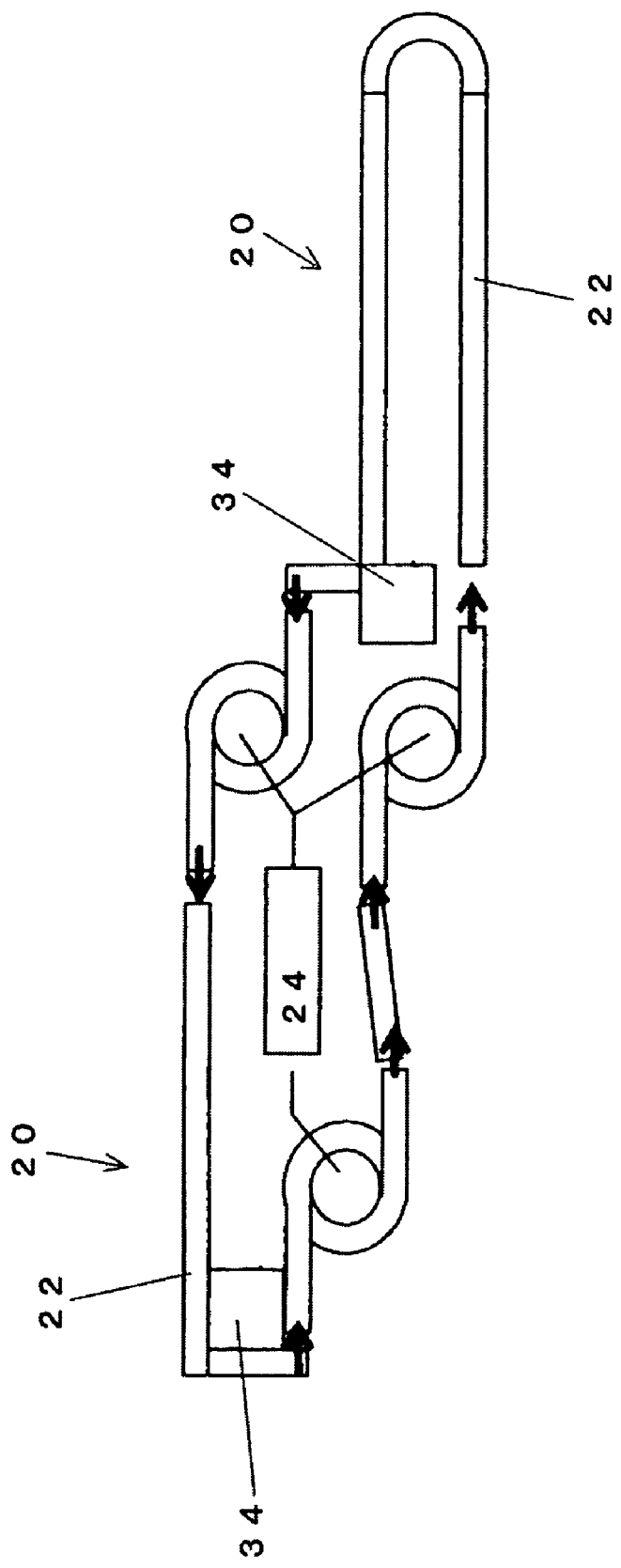
FIG. 27 is an explanation view of conveying units serially connected.

A branch pipe (not shown) may be connected to the mid part of the blower duct 22 so as to make up a flow volume and a flow speed by an auxiliary blower (not shown). Further, as shown in FIG. 27, a plurality of the equipments 20 are serially connected, and the blower section (blower) 24 is provided between the adjacent equipments 20 so as to make up the flow volume and the flow speed.

Figure 28:
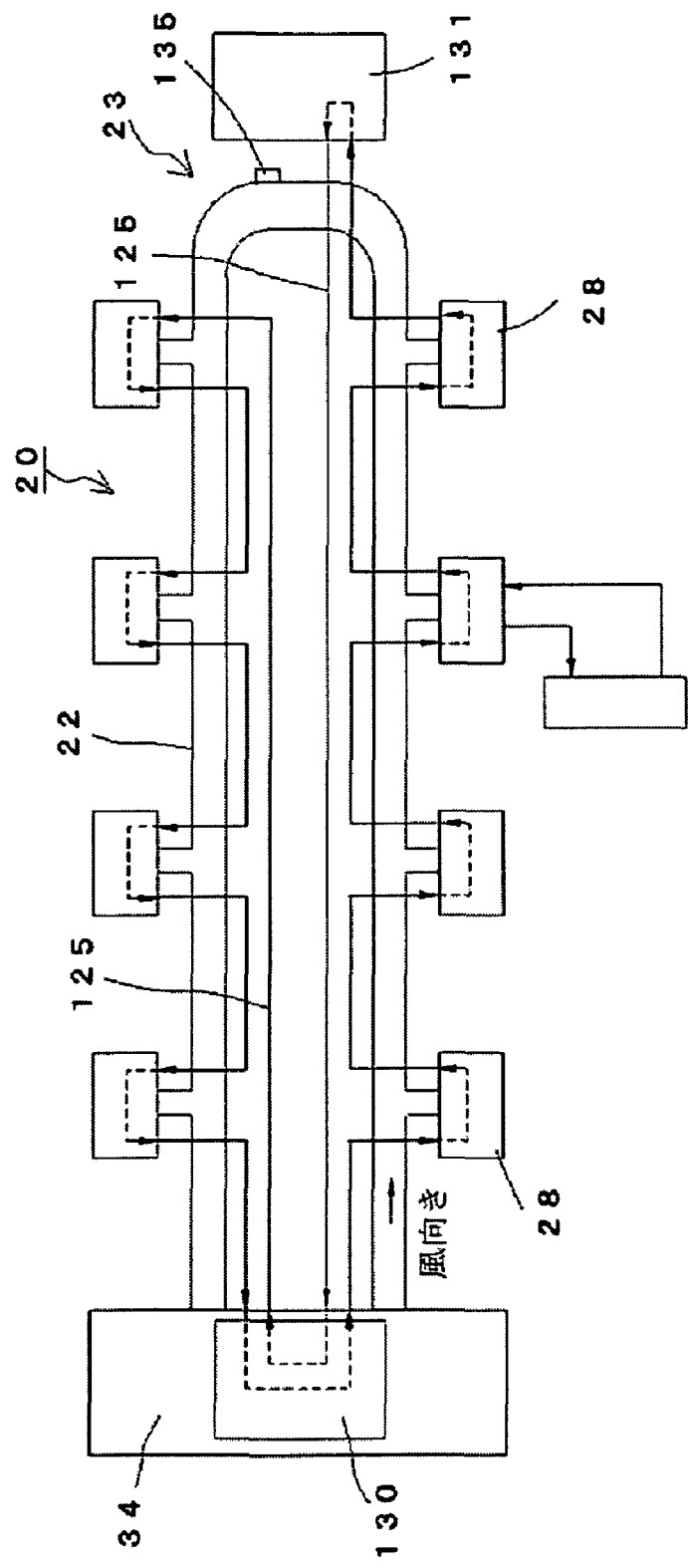
FIG. 28 is an explanation view of a wiring system of a control system.

Next, an example of a control system for conveying the sheet-shaped members 32 will be explained with reference to FIGS. 28 and 29. In the following description, the equipment 20 is used in a pinball parlor for conveying banknotes. The blower duct 22 is U-turned by the turning section 23 and connected to the collecting unit 34. The sheet feeding units 28 respectively have the banknote identification units and the bending units.

A plurality of the sheet feeding units 28 are connected to the blower duct 22.

Figure 29:
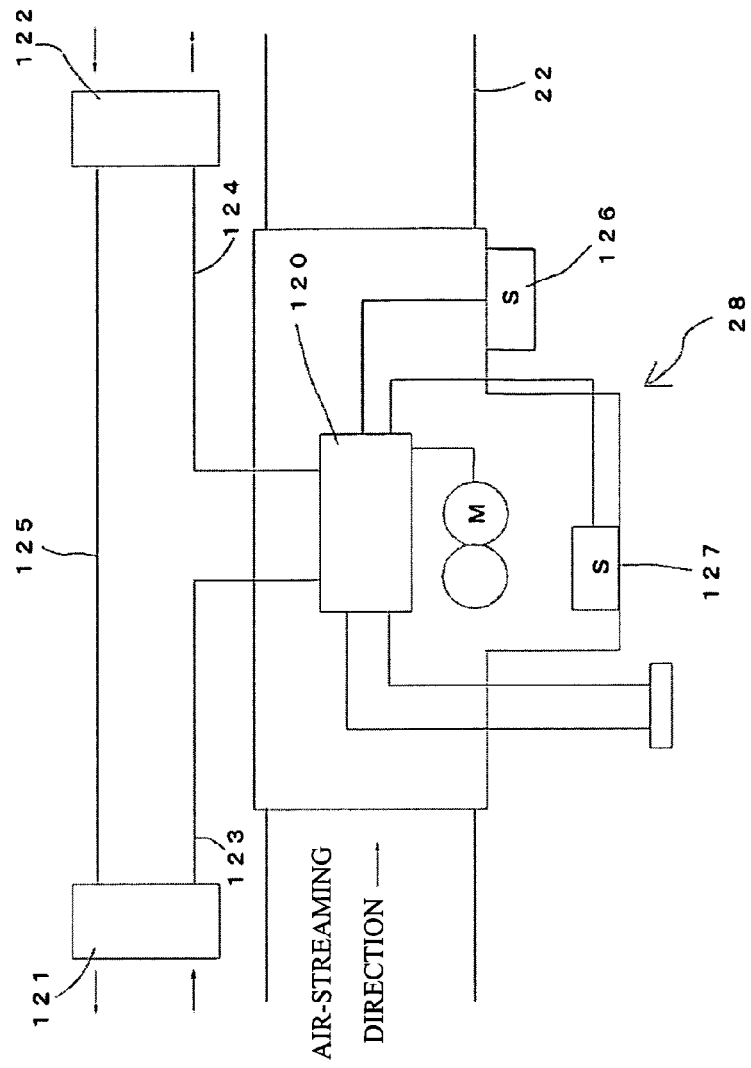
FIG. 29 is an explanation view of a wiring structure of a sheet feeding unit.

As shown in FIG. 29, the sheet feeding units 28 have the same wiring structure.

A symbol 120 stands for a substrate (an individual control section) of the sheet feeding unit 28, and an upside connector 121 and a downside connector 122 are respectively connected to the individual control section 120 by wires 123 and 124. The upside connector 121 is connected to the downside connector 122 by a wire 125. An inlet sensor 127 and a ball lending unit (not shown) are connected to the control section 120, and an outlet sensor 126, which detects the sheet-shaped member 32 staying in the blower duct 22, is also connected thereto.

When the inlet sensor 127 detects a banknote 32 put in the sheet feeding unit 28, the known banknote identification unit checks if the banknote 32 is a real one or not; if the banknote 32 is the real one, an IC card, in which a number of lendable balls corresponding to the amount of money is written, is provided to a player, and the player can get the balls by inserting the IC card into the ball lending unit. The deformity is formed in the banknote 32 by the bending unit, and the banknote is fed into the blower duct 22 and collected by the collecting unit 34. Note that, the outlet sensor 126 is provided to the connection part between the sheet feeding unit 28 and the blower duct 22 so as to check if the banknote 32 is conveyed or not, and the outlet sensor sends a signal to the control section 120.

If the banknote is a counterfeit banknote, the counterfeit banknote is returned to the inlet of the banknote identification unit.

An entire control section 130 is provided to the collecting unit 34.

Electric connection structures between the control section 130 and the control sections 120 of the sheet feeding units 28 and between the control sections 120 of the sheet feeding units 28 will be explained.

In the present embodiment, the electric connection structures are divided into an upstream side loop and a downstream side loop by the turning section 23, in which the banknotes 32 will be easily get jammed. Note that, a turning section sensor 135 is provided to the turning section 23.

The upstream side loop is constituted as the control section 130—the sheet feeding units 28 (on the upstream side)—the sheet feeding units 28 . . . —a turning section connector 131—the wire 125—the control section 130.

The downstream side loop is constituted as the control section 130—the wire 125—the sheet feeding units 28 (on the upstream side)—the sheet feeding units 28 . . . —the control section 130.

The sheet feeding units 28 are electrically connected by connecting the downside connectors 122 of the sheet feeding units 28 on the upstream side to the upside connectors 121 of the sheet feeding units 28 on the downstream side with, for example, harnesses.

In the present embodiment, the wiring system is divided into two loops, but it may be one loop or may be divided into three loops or more.

In the present embodiment, the wiring systems are bounded by the U-shaped turning section 23, but the wiring system is not limited to the embodiment, so a plurality of wiring systems may be divided by the turning section, which is perpendicularly bent or twisted and in which banknotes will easily get jammed.

As described above, the wiring systems are bounded by the section in which banknotes will easily get jammed, but they may be bounded by an optional place or places.

Next, the action of the above described control system will be explained.

The control sections 120 of the sheet feeding units 28 on the upstream side transmit a permissive signal (normal signal: N signal), which is a voltage signal of a prescribed level and outputted from the control section 130, to the control sections 120 of the sheet feeding units 28 on the downstream side.

In case that a banknote is put in the sheet feeding unit 28, the sheet feeding unit 28 prepares for feeding the banknote into the blower duct 22 (the deformity is formed in the banknote to be fed into the blower duct 22), and then the control section 120 of the sheet feeding unit 28 transmits a prohibitive signal (active signal: A signal), whose voltage is lower than that of the N signal, to the control sections 120 of the sheet feeding units 28 on the downstream side for a prescribed time period (e.g., 2.5 sec.) or until the banknote is collected by the collecting unit 34, without reference to the signal statuses of the upstream side, so as not to feed banknotes on the downstream side. Then, the banknote 32 is fed into the blower duct 22 and collected by the collecting unit 34.

If a banknote is put in the sheet feeding unit 28 on the downstream side, the sheet feeding unit 28 holds the banknote. Namely, the banknote is identified and the deformity is formed therein, but the banknote is held between the feed rollers 33a and 33a.

After the banknote is fed into the blower duct 22 from the sheet feeding unit 28 on the upstream side and the prescribed time (2.5 sec.) elapses, the control section 120 of the present sheet feeding unit 28 transmits the permissive signal (N signal) to the sheet feeding units 28 on the downstream side for a prescribed time period (e.g., 1 sec.) or until the banknote is collected by the collecting unit 34, without reference to the signal statuses of the upstream side. Therefore, the banknotes 32 can be fed into the blower duct 22 from the sheet feeding units 28 on the downstream side in order of position from the nearest to the furthest and can be collected. While the nearest sheet feeding unit 28 is waiting for the permissive signal, other sheet feeding units 28 on the further downstream side are prohibited to feed banknotes.

Even if a plurality of the sheet feeding units 28 are ready to feed banknotes, the sheet feeding unit 28 which has been ready earliest prohibits other sheet feeding units 28 to feed banknotes, and the sheet feeding unit allows the nearest sheet feeding unit 28 on the downstream side which has been ready to feed a banknote after the bank note is completely fed and the prescribed time elapses. Therefore, the sheet feeding units can feed banknotes 32 in order, and the banknotes can be collected in order.

In case that no sheet feeding units 28 are waiting for feeding banknotes, the permissive signal is sent for 1 sec., so that all of the sheet feeding units 28 are allowed to feed banknotes, so all of the sheet feeding units 20 in the equipment 20 are changed to waiting states.

Therefore, a large amount of banknotes 32 are not fed into the blower duct 22, so that the collecting unit 34 is not overloaded and the collecting unit 34 can be downsized.

In case that banknotes 32 are simultaneously put in a plurality of the sheet feeding units 28, there is possibility of closing the blower duct. To avoid simultaneously feeding banknotes, the control section 130 may circulate a feeding right signal, which has a prescribed pulse width, in the wiring systems.

Even if the sheet feeding unit 28 is ready to feed a banknote, the control section 120 cannot feed the banknote as far as the feeding right signal is not received.

Therefore, one of the prepared sheet feeding units 28 which has received the feeding right signal earlier than others can feed the banknote 32 into the blower duct 22, and the banknote 32 can be collected. The prohibitive signal is transmitted toward the downstream side for the prescribed time period (e.g., 2.5 sec.), in which the banknote 32 is fed by the sheet feeding unit 28 and collected by the collecting unit 34. After a lapse of the prescribed time period, the permissive signal is transmitted toward the downstream side for the prescribed time period (e.g., 1 sec.).

On the downstream side, the prepared sheet feeding units 28 receive the feeding right signal and feed banknotes 32 in order, and the banknotes are conveyed and collected. Even if banknotes 32 are simultaneously put in a plurality of the sheet feeding units 28, they are not simultaneously fed into the blower duct 22, so that the blower duct is not closed.

For example, in case that one player will put in two 1000 yen notes, if another player puts in one 1000 yen note immediately after the player puts in one note, the player must wait for the prescribed time period to put in another note.

In this case, the first 1000 yen note is sent to the bending unit 30 and held there, the second 1000 yen note is put in and checked by the banknote identification unit 29, an IC card is issued, the second 1000 yen note is held in the banknote identification unit 29, and then the two held notes are fed.

In another case, three or more banknotes are continuously put in.

In this case, a stocker (not shown) is provided to the banknote identification unit 29, banknotes are stocked in the stocker after checking the banknotes, the equipment 20 controls to send the banknotes stocked from the stocker to the bending unit 30, and the bending unit 30 feeds the banknotes into the blower duct 22 in order.

The equipment, in which the banknote identification unit has the stocker for stocking a plurality of banknotes and the banknotes are fed from the stocker, is disclosed in Japanese Patent Gazette No. 2007-105287.

Control for recovering an abnormal state of the equipment 20 will be explained.

In case that the turning section sensor 135 is masked and the banknote 32 gets jammed in the turning section 23, a turn control section, not shown, to which a signal is inputted from the turning section sensor 135, transmits a pulse signal, which has a prescribed pulse width, to the control section 130, the control section 130 sends the prohibitive signal (A signal) to the sheet feeding units 28 on the upstream side (the sheet feeding units 28 connected to the upstream side loop) so as not to feed banknotes. When the turning section sensor 135 is unmasked (the turning section is unjammed), voltage of the pulse signal is changed to the prescribed level (equal to that of the N signal). Therefore, the control section 130 allows to feed or changes to the normal state. Note that, the turn control section may directly transmit the prohibitive signal (A signal) to the control sections 120 of the sheet feeding units 28 on the upstream side (the sheet feeding units 28 connected to the upstream side loop).

For example, number of the jammed banknotes 32, which have been detected by the turning section sensor 135, is gained by counting number of feed signals sent from the sheet feeding units 28 on the upstream side, if the number of the jammed banknotes is smaller than a prescribed number, the state is regarded as a retaining state and the prohibitive signal is not outputted; if the number of the jammed banknotes is equal to or greater than the prescribed number, the state is regarded as a closing state, an error signal is outputted and the prohibitive signal is transmitted to the sheet feeding units 28 on the upstream side (the sheet feeding units 28 connected to the upstream side loop) so as not to feed banknotes.

In case that the sheet feeding unit 28 misfeeds a banknote (the banknote is fed but the outlet sensor 126 is masked), the control section 120 outputs a pulse signal having a prescribed pulse width, which indicates the retaining state, to the control section 130. The control section 120 performs retry up to four times. The retry is performed by alternately rotating the feed rollers 33a and 33a in the reverse direction and the normal direction, and distances of sending and returning a banknote (rotational angles of the motor 84) are changed for each try. After completing the retries, if the outlet sensor 126 is masked, the state is regarded as the retaining state, and the same treatment is repeatedly performed. The control section 120 outputs a signal for prohibiting the sheet feeding unit 28 in the retaining state from receiving banknotes.

When the outlet sensor 126 is unmasked, the equipment is changed to the normal state.

In case that banknotes get jammed in the collecting unit 34 and the banknotes cannot be collected, the control section 130 prohibits all of the sheet feeding units 28 from feeding banknotes. Alternatively, the control section prohibits all of the sheet feeding units 28 from receiving banknotes. The collecting unit 34 has various sensors, not shown, e.g., sensor for detecting banknote jam at the inlet, sensor for detecting banknote jam at the restoring rollers 104, sensor for detecting a jam-packed state of the banknote accommodating section 98, so as to check if banknotes can be collected or not.

When the collecting unit 34 is full filled and cannot collect banknotes more, if the sheet feeding unit 28 further feeds banknotes, the banknotes will close the inlet of the banknote accommodating section 98.

If such trouble occurs in the collecting unit 34, the trouble is manually recovered by an operator.

To manually remove the jammed banknotes, the collecting unit 34 can be opened and closed by a lid (not shown).

The control section 130 performs an off-line check. A prescribed pulse is inputted to the upstream side of each of the loops, and the control section 130 checks if the pulse returns or not. If the pulse normally returns, the loop is correctly connected; if the pulse does not return, the loop is in a disconnecting state (off-line), so an alarm is put out.

The control section 130 periodically performs the off-line check while the equipment 20 is in operation, but the operator may manually perform the off-line check by pushing a button.

Controlling the entire system by the control sections 120 and 130 is performed on the basis of preinstalled programs.

Figure 30:
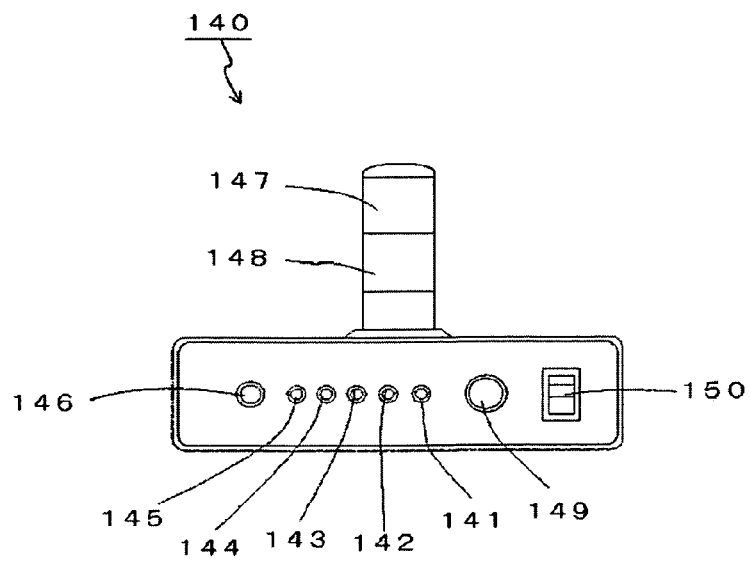
FIG. 30 is an explanation view of an indicator.
Figure 31:
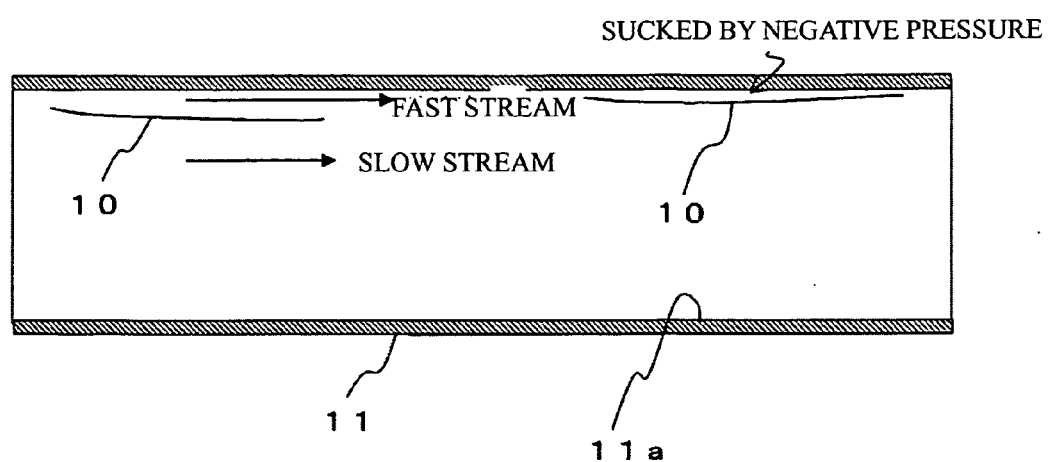
FIG. 31 is an explanation view, wherein flat sheet-shaped members are conveyed.

An indicator 140 for indicating various states of the equipment 20 is shown in FIG. 30.

An LED 141 is turned on when the outlet sensor 126 detects retained banknotes.

An LED 142 is turned on when the turning section sensor 135 detects the banknote jam.

An LED 143 is turned on when the banknote accommodating section 98 is full filled.

An LED 144 is turned on when banknote get jammed in the restoring rollers 104.

An LED 145 is turned on when banknotes get jammed at the inlet of the collecting unit 34.

An LED 146 is turned on while the equipment is in the normal state.

A large lamp 147 can be seen from a remote place, and it is turned on when errors, e.g., closing the inlet, banknote jam in the restoring rollers, fully filling the banknote accommodating section, closing the turning section, occur.

A large lamp 148 can be seen from a remote place, and it is turned on while the equipment is in the normal state.

A symbol 149 stands for a reset button, and a symbol 150 stands for a power source switch for the indicator.

The indicator 140 may be composed of a liquid crystal display or CRT, a screen of the indicator may be divided into two parts, wherein the above described errors, etc. may be indicated in one part and a television picture may be indicated in the other part.

In the above described embodiment, the control system controls the sheet feeding units 28 to feed banknotes 32 in order of position from the upstream side to the downstream side, but the control system controls the sheet feeding units 28 to feed banknotes 32 in order of position from the downstream side to the upstream side (not shown). In this case, if a banknote 32 is fed from the uppermost sheet feeding unit 28, the lowermost sheet feeding unit 28 feeds a banknote next, so the banknotes 32 are closely fed and they will easily get jammed in collecting unit 34. Therefore, the former manner is better.

Alternatively, in case that banknotes are put in a plurality of the sheet feeding units 28, the banknotes 32 may be fed into the blower duct 22 in order of putting the banknotes 32 in the sheet feeding units 28.

The conveying equipment of the present invention can be suitably installed in a game hall, such as a pinball parlor and a casino, so as to collect sale proceeds.

The conveying equipment of the present invention can be suitably installed in a store, such as a supermarket and a convenience store, so as to collect sale proceeds.

The conveying equipment of the present invention can be suitably installed in an automatic vending machine, e.g., automatic card vending machine, automatic train ticket vending machine, automatic admission ticket vending machine, automatic juice vending machine, automatic cigarette vending machine, so as to collect sale proceeds. The conveying equipment of the present invention can be suitably installed in a manned sales space (where a salesclerk puts banknotes in the sheet feeding unit), such as a ticket office, a lottery kiosk and a betting booth, so as to collect sale proceeds.

The conveying equipment of the present invention can be suitably applied to a betting ticket vending machine (automatic vending machine), which is installed in a horse race track, a bicycle race track or a boat race track, as to collect sale proceeds.

The conveying equipment of the present invention can be suitably installed in a car parking space so as to collect sale proceeds.

The conveying equipment of the present invention can be suitably used to convey banknotes, which have been entrusted through an ATM (automated teller machine), to a safe place (e.g., a strong box in a bank).

The equipment may be used to convey money for change (banknotes) to a cash register installed in a store, such as a supermarket and a convenience store, or convey banknotes to an ATM for paying out.

Further, the equipment may be used to convey banknotes for change to a sales space, such as a ticket office, a lottery kiosk and a betting booth.

What is claimed is:

1. A method of conveying a sheet paper in an equipment including:
   a blower duct; a sheet feeding unit for feeding the sheet paper to the blower duct; and an air stream unit for generating an air stream in the blower duct,
   said method comprising the steps of:
   forming a temporary deformity in the sheet paper;
   feeding the sheet paper from the sheet feeding unit to the blower duct; and
   conveying the sheet paper by applying a wind pressure to the deformity,
   wherein a plurality of ribs extending in an air-streaming direction are formed in each of wall faces of the blower duct, which face surfaces of the sheet paper, and
   a distance between front ends of the ribs formed in each of the wall faces is designed to allow the deformity of the sheet paper to pass through a space between the ribs.

2. The method according to claim 1, wherein the temporary deformity is formed in a rear part of the sheet paper with respect to the conveying direction.

3. The method according to claim 2, wherein the temporary deformity is formed in a flat part of the sheet paper and is concaved or projected toward the sheet feeding unit.

4. The method according to claim 2, wherein the temporary deformity has a rounded surface.

5. The method according to claim 2, wherein the temporary deformity is formed into an L-shape.

6. The method according to claim 2, wherein the temporary deformity is formed into a zigzag shape.

7. The method according to claim 2, wherein the temporary deformity is formed by passing the sheet paper, whose rear part has been folded into two, between feed rollers.

8. The method according to claim 1, wherein the equipment further includes a bending unit for bending the sheet paper and feeds the sheet paper, in which the temporary deformity has been automatically formed by the bending unit, to the blower duct.

9. The method according to claim 1, wherein the sheet paper consists of a bank note.

10. An equipment for conveying a sheet paper including:
    a blower duct;
    a sheet feeding unit for feeding the sheet paper to the blower duct; and
    an air stream unit for generating an air stream in the blower duct,
    wherein said equipment further includes a bending unit for bending the sheet paper so as to form a temporary deformity in the sheet paper, and
    the sheet paper is conveyed by applying a wind pressure to the deformity,
    wherein a plurality of ribs extending in an air-streaming direction are formed in each of wall faces of the blower duct, which face surfaces of the sheet paper, and
    a distance between front ends of the ribs formed in each of the wall faces is designed to allow the deformity of the sheet paper to pass through a space between the ribs.

11. The equipment according to claim 10, wherein the air stream unit is driven when the sheet paper is put in the sheet feeding unit.

12. The equipment according to claim 10, wherein an air filter, an electric dust collector or an ozone generator is provided between an air-outlet or an air-inlet of the air stream unit and the blower duct.

13. The equipment according to claim 10, wherein the temporary deformity is formed in a rear part of the sheet paper with respect to the conveying direction.

14. The equipment according to claim 13, wherein the temporary deformity is formed in a flat part of the sheet paper and is concaved or projected toward the sheet feeding unit.

15. The equipment according to claim 13, wherein the temporary deformity has a rounded surface.

16. The equipment according to claim 13, wherein the temporary deformity is formed into an L-shape.

17. The equipment according to claim 13, wherein the temporary deformity is formed into a zigzag shape.

18. The equipment according to claim 13, wherein the temporary deformity is formed by passing the sheet paper, whose rear part has been folded into two, between feed rollers.

19. The equipment according to claim 13, wherein the bending unit comprises:
    a pair of feed rollers for feeding the sheet paper into the blower duct, one of the feed rollers being capable of moving to and away from the other feed roller and being always biased toward the other feed roller by a biasing member;
    a motor for rotating the feed rollers in a normal direction and a reverse direction;
    open/close means being provided on the upstream side of the feed rollers, the open/close means opening a path when the sheet paper is fed and closing the path when a rear end of the sheet paper passes, the open/close means having a sloped guide section, which faces the feed rollers;
    a stopper being formed in one side of the sloped guide section;
    a pouched section being formed in the other side of the sloped guide section;
    a sensor for detecting if the sheet paper passes through the open/close means or not; and
    a control section to which a signal of the sensor is sent, and
    wherein the control section drives the motor to rotate the feed rollers in a sheet feeding direction, feeds the sheet paper to be fed to the path a prescribed distance, rotates the motor a prescribed angle in the reverse direction and moves the sheet paper backward by the feed rollers when the sensor detects the rear end of the sheet paper passing the open/close means and sends the signal so as to guide the rear end part of the sheet paper by the sloped guide section until contact the stopper, two-folds the rear end part of the sheet paper in the pouched section by further rotating the motor in the reverse direction, rotates the motor in the normal direction so as to pass the two-folded part of the sheet paper between the feed rollers with moving the one feed roller away from the other feed roller against a biasing force of the biasing member and form the deformity in the sheet paper, and feeds the sheet paper into the blower duct.

20. The equipment according to claim 19, wherein the one feed roller is rotatably attached to one ends of a pair of L-shaped arms, which are pivotably connected at center parts, and one end of the biasing member is connected to the other ends of the L-shaped arms, and wherein the one feed roller is attached to the L-shaped arms so as to press the one feed roller onto the other feed roller by a frictional force between the sheet paper and the feed rollers when the motor is rotated in the reverse direction to move the sheet paper backward and so as to move the one feed roller away from the other feed roller by the frictional force between the sheet paper and the feed rollers when the motor is rotated in the normal direction to pass the folded part of the sheet paper between the feed rollers.

21. The equipment according to claim 19, wherein the open/close means has a pair of claw pieces, which are respectively provided on the both sides of the path, at least one of the claw pieces is a movable claw piece, which is always biased toward the other claw piece, by a biasing member, so as to close the path, and wherein the movable claw piece is pressed by a front end of the sheet paper and moved against a biasing force of the biasing member when the sheet paper is fed to the feed rollers, so that the path is opened, and the movable claw piece is returned by the biasing force of the biasing member when the rear end of the sheet paper passes the movable claw piece, so that the path is closed.

22. The equipment according to claim 19, further comprising a seal section capable of preventing air leakage from the sheet feeding unit including the bending unit.

23. The equipment according to claim 13, wherein the bending unit comprises:

a pair of feed rollers for feeding the sheet paper into the blower duct;

a motor for rotating the feed rollers in a normal direction and a reverse direction;

open/close means being provided on the upstream side of the feed rollers, the open/close means opening a path when the sheet paper is fed and closing the path when a rear end of the sheet paper passes, the open/close means having a sloped guide section, which faces the feed rollers;

a sensor for detecting if the sheet paper passes through the open/close means or not; and a control section to which a signal of the sensor is sent, and wherein the control section drives the motor to rotate the feed rollers in a sheet feeding direction, feeds the sheet paper to be fed to the path a prescribed distance, rotates the motor a prescribed angle in the reverse direction and moves the sheet paper backward by the feed rollers when the sensor detects the rear end of the sheet paper passing the open/close means and sends the signal so as to press the rear end part of the sheet paper onto the sloped guide section and concave the rear end part toward the feed roller located on the downstream side in the air-streaming direction, and rotates the motor in the normal direction to feed the sheet paper into the blower duct.

24. The equipment according to claim 13, wherein the bending unit comprises:

a pair of feed rollers for feeding the sheet paper into the blower duct;

a motor for rotating the feed rollers in a normal direction and a reverse direction;

a press roller being pressed onto the feed roller, which is located on the downstream side in the air-streaming direction;

a guide section being neighbored the press roller and having an arc face constituting a space, through which the sheet paper can pass, with an outer circumferential face of the feed roller located on the downstream side;

open/close means being provided on the upstream side of the feed rollers, the open/close means opening a path when the sheet paper is fed and closing the path when a rear end of the sheet paper passes, the open/close means having a sloped guide section, which faces the feed rollers;

a sensor for detecting if the sheet paper passes through the open/close means or not; and a control section to which a signal of the sensor is sent, and wherein the control section drives the motor to rotate the feed rollers in a sheet feeding direction, feeds the sheet paper to be fed to the path a prescribed distance, rotates the motor a prescribed angle in the reverse direction and moves the sheet paper backward by the feed rollers when the sensor detects the rear end of the sheet paper passing the open/close means and sends the signal so as to guide the rear end part of the sheet paper by the guide section and further feed along the arc face of the guide section with pinching the rear end part by the press roller and the feed roller located on the downstream side, deforms the rear end part to concave toward the feed roller located on the downstream side or formed into a cylindrical shape, and rotates the motor in the normal direction to feed the sheet paper into the blower duct.

25. The equipment according to claim 10, wherein a sectional shape of a space defined by lines connecting the front ends of the ribs is a rectangular shape.

26. The equipment according to claim 10, wherein the blower duct has a turning section, which turns and conveys the sheet paper; and wherein a height of the ribs formed in an inner wall face of the turning section, which faces the inner surface of the turned sheet paper, is gradually reduced from a specified position, which is located on the upstream side of the turning section and separated a prescribed distance therefrom, to the turning section, and the height of the ribs is gradually increased from the turning section to a specified position, which is located on the downstream side of the turning section and separated a prescribed distance therefrom.

27. The equipment according to claim 10, wherein the blower duct has a turning section, which turns and conveys the sheet paper, and wherein the ribs formed in an inner wall face of the turning section, which faces the inner surface of the turned sheet paper, respectively have raised parts, which are closely provided on the upstream side of the turning section and inwardly projected in the blower duct, and a height of the ribs is gradually increased, from almost zero, from the turning section to a specified position, which is located on the downstream side of the turning section and separated a prescribed distance therefrom.

28. The equipment according to claim 10, wherein the blower duct has a turning section, which turns and conveys the sheet paper, and wherein no ribs are formed in an inner wall face of the turning section, and raised parts are formed in an inner face of an entry part of the turning section, which faces the inner surface of the turned sheet paper, so as to reduce an effective sectional area of the blower duct.

29. The equipment according to claim 10, wherein a twisted duct section, which is twisted a prescribed angle with respect to an axial line of the blower duct, is connected to the blower duct, and the twisted tube section has ribs connected to the ribs of the blower duct.

30. The equipment according to claim 10, wherein the blower duct is constituted by a plurality of ducts, which are connected by a flexible connecting duct.

31. The equipment according to claim 10, wherein the blower duct is formed by connecting a plurality of ducts, and a connection part between the ducts is covered with a sealing member composed of a material made of resin or rubber.

32. The equipment according to claim 31, wherein ring-shaped projections are formed in an inner face of the sealing member and respectively located on the both sides of the connection part.

33. The equipment according to claim 10, wherein a collecting unit, which collects the sheet paper conveyed through the blower duct, is provided to an end part of the blower duct.

34. The equipment according to claim 33, wherein the collecting unit has a separating section, which has an air discharge tube and which separates the sheet paper from the air stream.

35. The equipment according to claim 34, wherein the air discharge tube is connected to the air stream unit so as to circulate the air steam.

36. The equipment according to claim 33, wherein the air discharge tube is connected to an external air-inlet.

37. The equipment according to claim 33, wherein the collecting unit has a restoring roller, which bend the deformity of the sheet paper in the opposite direction so as to remove the deformity.

38. The equipment according to claim 37, wherein the collecting unit has an accommodating section, in which the sheet paper sent by the restoring roller is accommodated, and
wherein the accommodating section is divided into a first space and a second space by a movable press plate, and the sheet papers are alternately accommodated in the first space and the second space by alternately moving the movable press plate with respect to a sheet entrance.

39. The equipment according to claim 33, wherein the collecting unit has a plurality of restoring rollers, and the sheet paper is passed through the restoring rollers in a zigzag pattern so as to remove the deformity.

40. The equipment according to claim 10, wherein a plurality of the sheet feeding units are provided to the blower duct with at regular intervals.

41. The equipment according to claim 40, further comprising a control system for controlling sheet-feeding order of the sheet feeding units, and
wherein the control system controls the sheet feeding units to feed the sheet papers to the blower duct on the basis of the sheet-feeding order.

42. The equipment according to claim 41, wherein outlet sensors are respectively provided to parts of the blower duct, to which the sheet feeding units are connected, and
wherein the individual control section repeatedly rotates the feed rollers in the normal direction and the reverse direction to convey the sheet paper when the outlet sensor detects the sheet paper staying in the blower duct.

43. The equipment according to claim 42, wherein the individual control sections prohibit to supply the sheet paper to the sheet feeding units when the sheet paper still stays in spite of repeatedly rotating the feed rollers in the normal direction and the reverse direction.

44. The equipment according to claim 40, further comprising a control system for controlling sheet-feeding order of the sheet feeding units, and
wherein the control system comprises:
an entire control section;
a plurality of individual control sections being respectively provided to the sheet feeding units; and
one or a plurality of wiring systems, in which the entire control section and the individual control sections are sequentially connected like a loop, and
wherein the entire control sections sends feeding-permissive signals of a prescribed level to the individual control sections of the sheet feeding units, and
wherein the individual control section of one sheet feeding unit sends feeding-prohibitive signals to the sheet feeding units on the downstream side for a prescribed time period, in which the deformity is formed in the sheet paper put in the one sheet feeding unit and the sheet paper is conveyed and collected by the collecting unit, and sends feeding-permissive signals to the sheet feeding units on the downstream side for a prescribed time period after the sheet paper is fed to the blower duct and a specified time elapses.

45. The equipment according to claim 44, wherein a turning section sensor and a turn control section are provided to the turning section of the blower duct, and the turn control section sends the feeding-prohibitive signals to the individual control sections of all of the sheet feeding units located on the upstream side of the turning section.

46. The equipment according to claim 44, wherein a turning section sensor is provided to the turning section of the blower duct, and the entire control section sends the feeding-prohibitive signals to the individual control sections of all of the sheet feeding units located on the upstream side of the turning section.

47. The equipment according to claim 44, wherein the entire control section is included in each of the wiring systems on one side of the turning section of the blower duct, where the sheet paper easily gets jammed.

48. The equipment according to claim 44, wherein the entire control section circularly outputs feeding right signals to the wiring system or systems, and
wherein the individual control section of each of the sheet feeding units feeds the sheet paper into the blower duct when the sheet feeding unit is in a standby state and receives the feeding-permissive signal and the feeding right signal.

49. The equipment according to claim 44, wherein the individual control sections prohibit to supply the sheet paper to the sheet feeding units when the sheet paper gets jammed in the collecting unit.

50. The equipment according to claim 44, wherein the individual control section of the one sheet feeding unit sends the feeding-permissive signals to the sheet feeding units on the downstream side for a prescribed time and controls them to feed the sheet papers in order of position from the nearest to the furthest.

51. The equipment according to claim 44, further comprising an indicating section for indicating an abnormal state when the sheet paper gets jammed in the turning section or the collecting unit cannot collect the sheet paper.

52. The equipment according to claim 10, wherein the equipment is installed in a pinball parlor, so as to collect sale proceeds.

53. The equipment according to claim 10, wherein the sheet feeding unit has a banknote identification unit, which is located on the front side of the bending unit, and the banknote checks if the sheet paper is a banknote or not, then the sheet paper is fed to the blower duct via the bending unit.

54. The equipment according to claim 53, wherein the banknote identification has a stocker for stocking banknotes and is capable of feeding the banknotes from the stocker to the bending unit in order.

55. The equipment according to claim 53, wherein the banknote identification is capable of stocking banknotes.

56. The equipment according to claim 10, wherein the equipment is installed in a casino, so as to collect sale proceeds.

57. The equipment according to claim 10, wherein the sheet paper consists of a bank note.

58. The equipment according to claim 10, wherein the equipment is installed in a supermarket or a convenience store, so as to collect sale proceeds.

59. The equipment according to claim 10, wherein the equipment conveys and collects banknotes which have been put in an ATM.

60. The equipment according to claim 10, wherein the equipment conveys banknotes to an ATM for paying out.

61. The equipment according to claim 10, wherein the equipment is installed in an automatic vending machine so as to collect sale proceeds.

62. The equipment according to claim 10, wherein the equipment conveys banknotes to a ticket office, a lottery kiosk, or a betting booth, as change.

63. The equipment according to claim 10, wherein the equipment is installed in a ticket office, a lottery kiosk, or a betting booth, so as to collect sale proceeds.

64. The equipment according to claim 10, wherein the equipment conveys banknotes to a cash register installed in a supermarket or a convenience store, as change.

* * * * *